(12) United States Patent
Muhammad et al.

(10) Patent No.: US 11,428,340 B2
(45) Date of Patent: Aug. 30, 2022

(54) ELECTRICALLY ACTUATED FLOW CONTROL VALVE AND METHOD FOR OPERATION OF THE FLOW CONTROL VALVE

(71) Applicant: Dana Canada Corporation, Oakville (CA)

(72) Inventors: Anis Muhammad, Mississauga (CA); Silvio Tonellato, Hamilton (CA)

(73) Assignee: Dana Canada Corporation, Oakville (CA)

( * ) Notice: Subject to any disclaimer, the term of this patent is extended or adjusted under 35 U.S.C. 154(b) by 0 days.

(21) Appl. No.: 15/931,382

(22) Filed: May 13, 2020

(65) Prior Publication Data
US 2020/0378519 A1    Dec. 3, 2020

Related U.S. Application Data

(60) Provisional application No. 62/853,766, filed on May 29, 2019.

(51) Int. Cl.
| | |
|---|---|
| *F16K 31/06* | (2006.01) |
| *F16K 41/04* | (2006.01) |
| *F16K 41/16* | (2006.01) |
| *F16K 1/42* | (2006.01) |

(52) U.S. Cl.
CPC ...... *F16K 31/0627* (2013.01); *F16K 31/0655* (2013.01); *F16K 41/04* (2013.01); *F16K 41/16* (2013.01); *F16K 1/422* (2013.01)

(58) Field of Classification Search
CPC ...... F16K 1/36; F16K 11/044; F16K 31/0627; Y10T 137/5987; Y10T 137/86622; Y10T 137/86686
See application file for complete search history.

(56) References Cited

U.S. PATENT DOCUMENTS

| | | | | |
|---|---|---|---|---|
| 3,329,165 | A | * | 7/1967 | Lang .................. F15B 13/0405 137/625.5 |
| 3,823,736 | A | * | 7/1974 | Vanti .................. F16K 31/0637 137/596.17 |
| 3,878,859 | A | | 4/1975 | Grob et al. |
| 4,074,700 | A | * | 2/1978 | Engle ................. F16K 31/0627 137/625.27 |
| 4,501,289 | A | | 2/1985 | Pauliukonis |
| 4,552,179 | A | * | 11/1985 | Tarusawa ........... F16K 31/0627 137/625.65 |
| 5,184,773 | A | | 2/1993 | Everingham |

(Continued)

FOREIGN PATENT DOCUMENTS

DE    10312169 A1    9/2004

Primary Examiner — Matthew W Jellett
(74) Attorney, Agent, or Firm — McCoy Russell LLP

(57) ABSTRACT

An electrically actuated valve is provided. The electrically actuated valve includes a valve housing comprising a valve chamber and a first and second port in fluidic communication with the valve chamber. The electrically actuated valve further comprises a valve sealing component including a cap sealing section adjacent to an opening in the valve housing and a valve seat arranged within the valve chamber between the first port and the second port and a plunger configured to couple to a solenoid piston and including a proximal seal configured to selectively sealingly interface with the valve seat.

20 Claims, 14 Drawing Sheets

(56) References Cited

U.S. PATENT DOCUMENTS

| | | | | |
|---|---|---|---|---|
| 5,718,264 | A | * | 2/1998 | Sturman ............. F15B 13/0405 137/625.65 |
| 5,904,333 | A | * | 5/1999 | Kelly ....................... F23N 1/007 137/489.5 |
| 6,089,262 | A | * | 7/2000 | Hart ....................... B60T 11/326 137/543.19 |
| 6,820,650 | B2 | * | 11/2004 | Solet ................... F16K 31/0627 137/315.03 |
| 7,159,615 | B2 | * | 1/2007 | Yamamoto .......... F16K 31/0624 137/596.17 |
| 9,714,718 | B2 | * | 7/2017 | Rogala ................... A62C 37/50 |
| 10,155,126 | B2 | | 12/2018 | Schwobe et al. |
| 2001/0032675 | A1 | * | 10/2001 | Russell ................... F16K 17/18 137/493.9 |
| 2006/0108435 | A1 | | 5/2006 | Kozdras et al. |
| 2009/0026405 | A1 | * | 1/2009 | Sheppard ........... G05D 23/1333 251/364 |
| 2010/0126594 | A1 | * | 5/2010 | Sheppard ................... F01P 7/16 137/340 |
| 2013/0105721 | A1 | | 5/2013 | Kabel et al. |
| 2015/0337981 | A1 | | 11/2015 | Miller et al. |
| 2019/0063632 | A1 | | 2/2019 | Schwobe et al. |
| 2019/0346065 | A1 | | 11/2019 | Byle et al. |

* cited by examiner

ELECTRICALLY ACTUATED FLOW CONTROL VALVE AND METHOD FOR OPERATION OF THE FLOW CONTROL VALVE

CROSS-REFERENCE TO RELATED APPLICATION

This application claims priority to U.S. Provisional Application No. 62/853,766, entitled "ELECTRICALLY ACTUATED FLOW CONTROL VALVE," filed May 29, 2019, the entire contents of which is hereby incorporated by reference in its entirety for all purposes.

FIELD

The present disclosure relates to valve assemblies for controlling fluid flow in vehicle systems, and specifically to electrically actuated valves and methods for operation of the valves.

BACKGROUND

Valves are used extensively to control fluid flow in vehicles, including conventional motor vehicles powered by internal combustion engines, hybrid vehicles, and battery electric vehicles.

Fluid control valves in vehicles have included wax motors comprising a casing which contains a wax material that expands when heated to a predetermined temperature, and contracts when cooled below the predetermined temperature. The expansion of the wax material drives a piston which causes movement of a valve element to open or close a valve port. In many valves of this type, the operation of the actuator is dependent upon physical contact between the actuator casing and a vehicle fluid which may be the same or different from the fluid being controlled by the valve. This can complicate valve construction and constrains options for controlling the valve.

Attempts have been made to utilize solenoid valves in engine cooling systems. However, these solenoid valves have presented challenges with regard to valve sealing and manufacturing. For example, previous valve have included valve seats integrally formed with the valves housing. Consequently, manufacturing the valve seat in the interior of the valve presents issues with regard to manufacturing precision and also increases the complexity of the housing manufacturing process. The inventors have recognized a need for electrically actuated flow control valves for vehicles which have less complicated designs, are less costly to produce, and can be deployed in control systems of hybrid or battery electric vehicles, if desired.

SUMMARY

To overcome at least some of the aforementioned drawbacks an electrically actuated valve is provided. The electrically actuated valve comprises, in one example, a valve housing and a valve sealing component. The valve housing includes a valve chamber and a first and second port in fluidic communication with the valve chamber. The valve sealing component comprises a cap sealing section adjacent to an opening in the valve housing and a valve seat arranged within the valve chamber between the first port and the second port. The electrically actuated valve further includes a plunger configured to couple to a solenoid piston and including a proximal seal configured to selectively sealingly interface with the valve seat. Providing a valve sealing component with a valve seat allows a robust seal to be formed in the valve while also simplifying valve assembly. Valve leaks are consequently reduced and valve assembly efficiency is increased, if wanted.

In another example, the valve sealing component may include a plurality of struts extending between the valve seat and the cap sealing section in the valve sealing component. The struts allow the valve seat in the valve sealing component to be structurally reinforced to further reduce the chance of valve leakage and degradation while permitting fluid flow between the first and second valve ports.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Exemplary embodiments of the present disclosure will now be described, by way of example, with reference to the accompanying drawings, in which:

FIGS. 1-28 are drawn approximately to scale. However other relative dimensions of the components may be used, in other embodiments.

DETAILED DESCRIPTION

Figure 1:
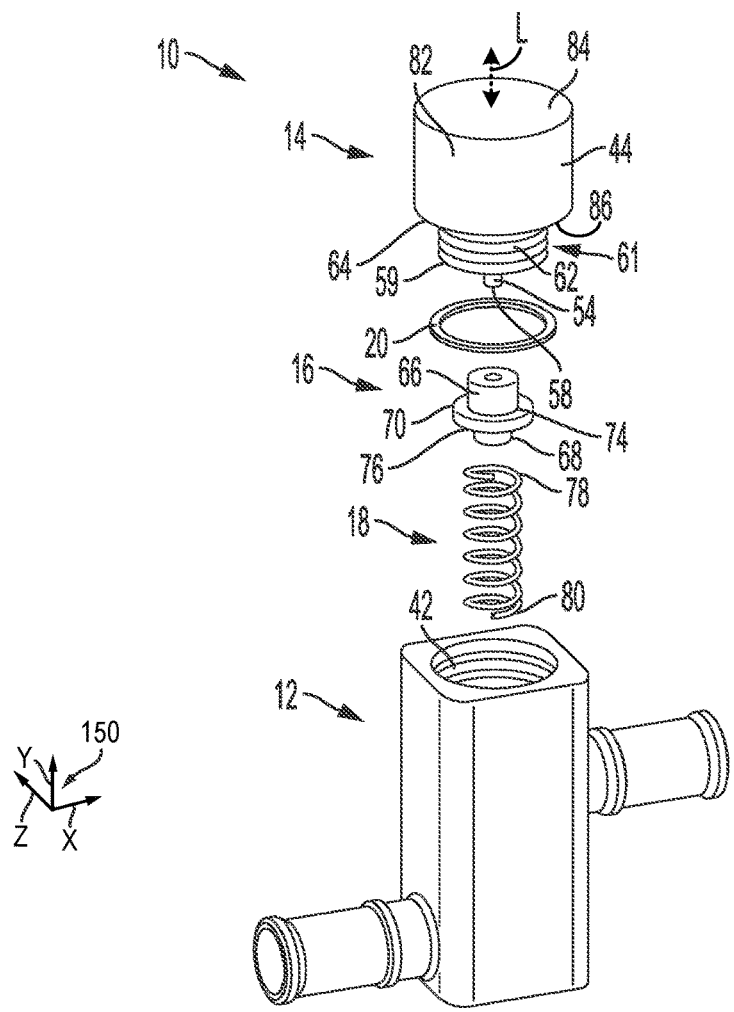
FIG. 1 is a perspective view of a two-port valve according to an embodiment, in a disassembled state.

Electrically actuated valve embodiments are described herein. The electrically actuated valve has an elegant design allowing the valve to achieve more robust valve sealing and streamlined valve manufacturing and assembly. The electrically actuated valve includes, in one example, a valve sealing component (e.g., cap) mating with a valve chamber to function as a sealing surface for a valve plunger. The valve sealing component may be designed for efficient insertion and sealing engagement with the valve housing. Providing a valve sealing component separate from the valve housing enables a sealing surface for the plunger to be located in a component separately manufactured from the valve housing, if desired. Therefore, in one example, the tolerances and/or material(s) used to construct the valve sealing component may be selected to achieve more robust valve sealing. The likelihood of valve leaking is therefore reduced. Furthermore, manufacturing complexity of the valve housing may be reduced when the valve sealing component is designed with plunger sealing capabilities. For example, complex machining steps for shaping a valve seat in the valve housing between the first and second ports may be omitted, if wanted. The solenoid assembly in the valve may also be secured to the housing via a threaded interface, snap ring, or a clip, in different embodiments. The valve's assembly/disassembly process can therefore be streamlined by allowing the solenoid assembly to be quickly and reliably secured within the valve's housing, in certain cases.

The valves described herein may be used in hydraulic systems, in one example. For instance, the valves may be deployed in vehicle systems, such as cooling systems that include conventional components such as one or more pumps, heat exchangers, conduits, etc. To elaborate, the valves may be used in an internal combustion engine, in one example, or an electric motor cooling system, in another example.

FIGS. 1-4 illustrate a two-port valve 10 according to a first embodiment. The valve 10 comprises a valve housing 12, a solenoid assembly 14, a plunger 16 comprising a distal seal 70, a return spring 18, and a resilient sealing member such as an O-ring 20. These components are shown in a disassembled state in FIG. 1.

Turning specifically to FIG. 1 illustrating an exploded view of the valve 10 including the valve housing 12, a solenoid assembly 14, the plunger 16, the O-ring 20, and the spring 18. The solenoid assembly 14 includes a body 103 with an exterior section 15 residing outside the valve housing 12, when the valve is in an assembled state. A solenoid 46, shown in FIGS. 3-4, also resides in an interior of the body 103. Continuing with FIG. 1, the solenoid body 103 also includes a threaded section 62 designed to threadingly engage with a threaded section 42 of the valve housing 12.

The solenoid assembly 14 further includes a piston 54 axially extending from the body 103. It will be understood, that internal componentry in the solenoid assembly 14 is designed to axially extend and retract the piston 54. As such, extension of the piston 54 places the valve in a closed configuration, where fluid is substantially inhibited from flowing therethrough, while retraction of the piston places the valve in an open configuration, where fluid is allowed to flow through the valve.

A longitudinal axis L of the valve 10 is illustrated in FIG. 1. As used herein, terms such as "axial" and "longitudinal" are understood to mean along or parallel to the longitudinal axis L. The longitudinal axis is also provided in FIGS. 2-28 for reference. Additionally, an axis system 150 is also provided in FIGS. 1-28 for reference. The z-axis may be a vertical axis (e.g., gravitational axis), the y-axis may be a longitudinal axis, and the x-axis may be lateral axis. However, other orientations of the axes may be used, in other examples.

Figure 2:
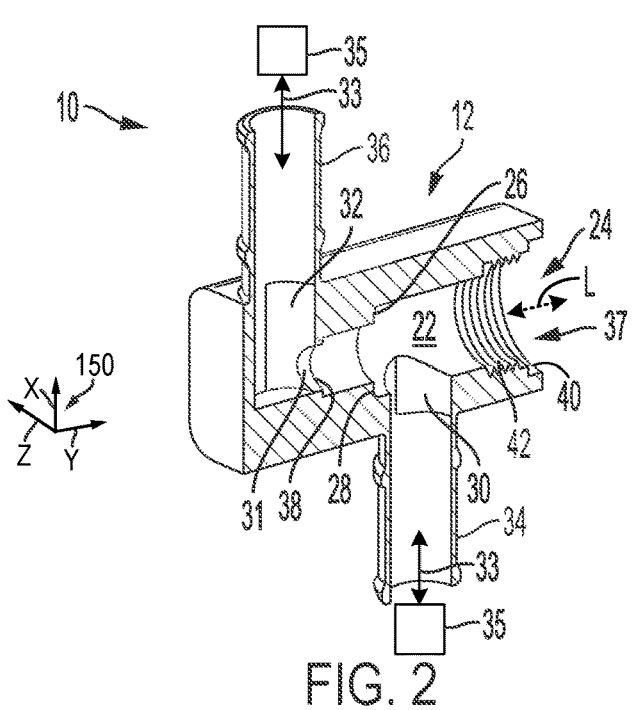
FIG. 2 is a cross-sectional view of a housing of the valve depicted in FIG. 1.

Turning to FIG. 2 showing the valve housing 12 with a hollow valve chamber 22 and an open end 24 through which the plunger 16 and return spring 18, depicted in FIG. 1, inserted. A first valve seat 26 is provided inside the valve chamber 22. In the illustrated embodiment, the valve chamber 22 is in the form of a cylindrical bore with one or more diameter reductions. To elaborate, a first diameter reduction provides a first annular shoulder 28 which defines the first valve seat 26.

FIG. 2 also shows the valve housing 12 further comprising a valve port 30 and a valve port 32 which are in fluidic communication with the hollow valve chamber 22. It can be seen from FIG. 2 that the first valve seat 26 and the first annular shoulder 28 are located between the valve ports 30, 32. The valve ports 30, 32 are respectively provided with first and second fittings 34, 36 projecting from the housing 12 and adapted to connect to conduits of a fluid circulation system of a vehicle. In the present embodiment the fittings 34, 36 are tubular. However, non-tubular shaped fitting may be used, in other embodiments. Either port 30, 32 may be the inlet or outlet of the valve 10, depending on the direction of fluid flow.

Arrows 33 denote the fluidic communication between the valve ports 30, 32 and a fluid circulation system 35 in a vehicle (e.g., vehicle cooling system). The fluid circulation system 35 may include conventional components such as heat exchanger(s), pump(s), valves, conduits extending between the system components, etc. It will also be appreciated that the fluid circulation system 35 depicted in FIG. 2 may be in fluidic communication with any of the valve embodiments described herein. As such, redundant description and illustration is omitted for brevity.

The valve port 30 may comprise an opening in the side wall of housing 12, and the valve port 32 communicates with the valve chamber 22 through an opening 37 in an end wall of the valve chamber 22, opposite to the open end 24. Surrounding the opening 37 may be a second annular shoulder 38.

At the open end 24 of the housing 12 there may be provided a cylindrical sealing surface 40, and the inner surface of the valve chamber 22 may be provided with threads 42. The threads in the housing are designed to threadingly engage with the threaded section 62 of the solenoid assembly 14, as previously mentioned. Additionally or alternatively, a snap ring, clip, and the like may be used to secure the solenoid assembly in the housing.

Figure 3:
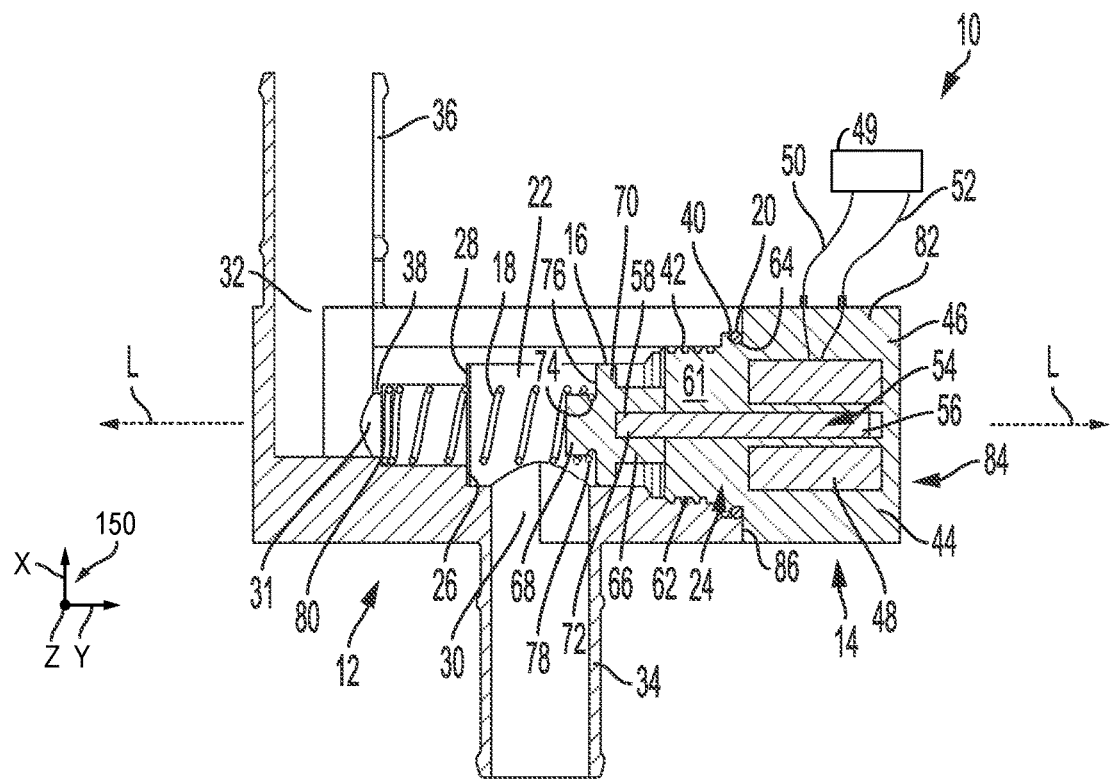
FIG. 3 is a longitudinal cross-sectional view of the valve depicted FIG. 1, in a first state.
Figure 4:
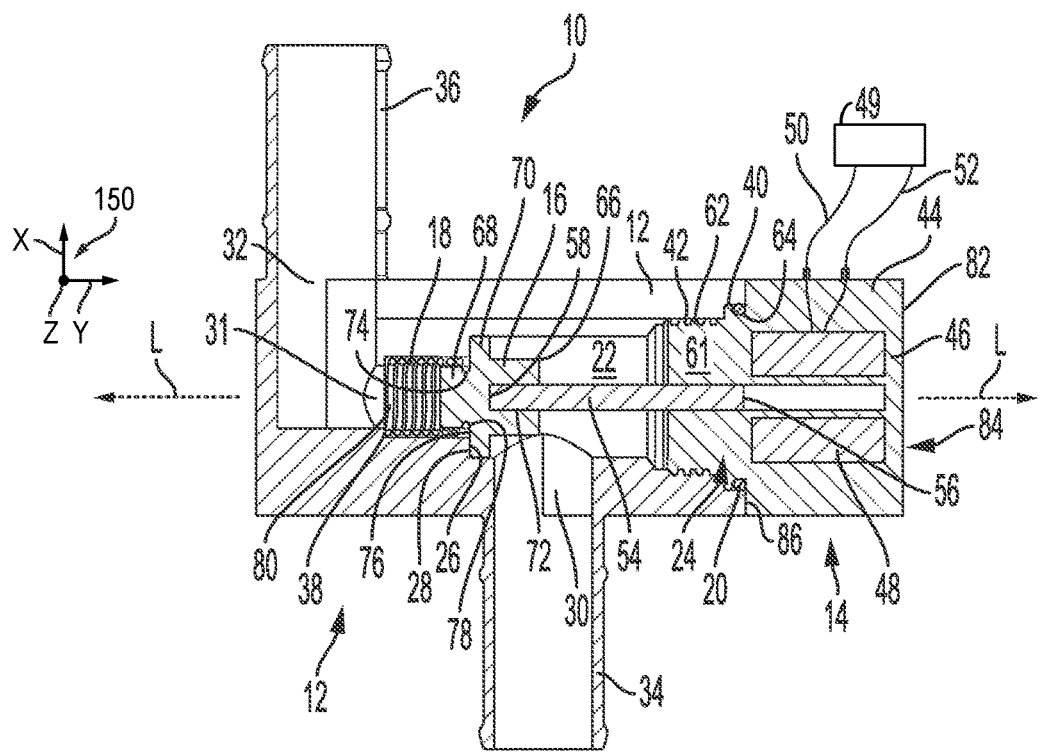
FIG. 4 is a longitudinal cross-sectional view of the valve depicted FIG. 1, in a second state.
Figure 5:
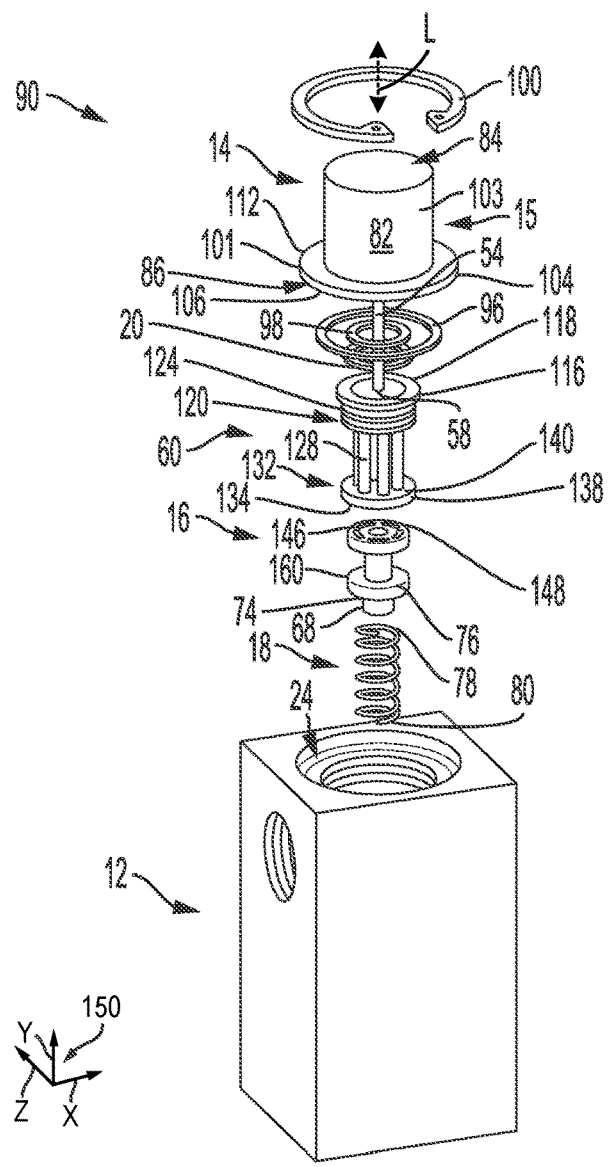
FIG. 5 is a perspective view of a three-port valve according to an embodiment, in a disassembled state.
Figure 6:
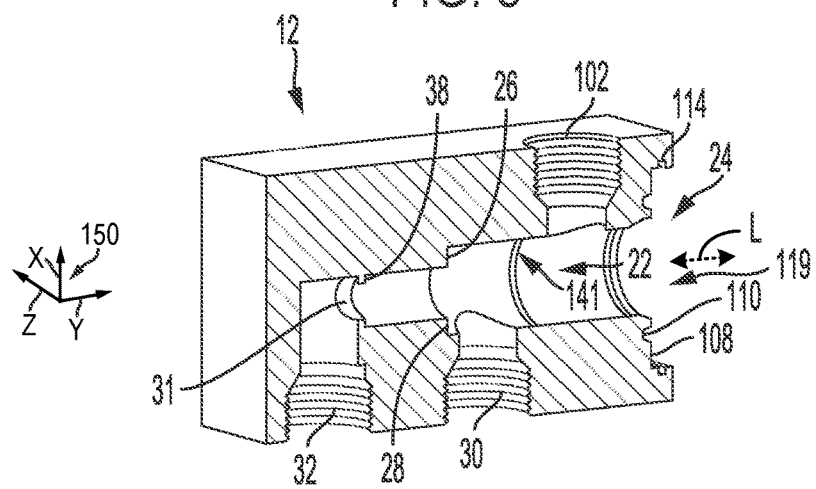
FIG. 6 is a cross-sectional view of a housing of the valve depicted in FIG. 5.

Turning to FIGS. 3-4, the solenoid assembly 14 is illustrated with an outer portion 44 having a first, outwardly facing end 84 and a second, inwardly facing end 86. The outer portion 44 may comprise an external housing 82 (e.g., generally cylindrical external housing) which houses the coil 48 of a solenoid 46. Lead wires 50, 52 provide electrical energy to the coil 48, and the energized coil creates an electromagnetic field. An electrical energy source 49 (e.g., battery, capacitor, etc.) may provide the electrical energy to the lead wires 50, 52. It will be understood, that a similar energy source may be electrically coupled to the lead wires in the other valve embodiments described herein. A plunger or piston 54 has a first end 56 located inside the coil 48, and a second end 58 projecting axially outwardly from the second end of outer portion 44, and into the valve chamber 22. The electromagnetic field created by the energized coil 48 causes the piston 54 to move longitudinally such that the second end 58 of the piston 54 moves further into the valve chamber 22 and away from the open end 24. As such, the piston 54 is constructed out of a material (e.g., steel and/or iron) that electromagnetically interacts with the coils during solenoid energization.

The solenoid assembly 14 further comprises a valve cap 59, which extends into the open end 24 of housing 12 and has external threads 62 which engage the threads 42 of the valve chamber 22, to retain the solenoid assembly 14. The valve cap 59 also includes a groove 64 which is axially aligned with the cylindrical sealing surface 40 at open end 24. A resilient sealing member, such as the O-ring 20, is provided in groove 64 and provides a fluid-tight seal between the valve cap 59 and the sealing surface 40. In the present embodiment, the inner and outer portions 61, 44 of the solenoid assembly 14 are shown as being integrally formed. However, it will be appreciated that the inner and outer portions 61, 44 of the solenoid assembly 14 may be separately formed.

In the embodiment shown in FIGS. 3-4, the plunger 16 further comprises a first end portion 66, a second end portion 68, both of which may be substantially cylindrical, with the distal seal 70 comprising an annular disc located between the end portions 66, 68, and having a greater diameter than end portions 66, 68. The first end portion 66 has an internal bore 72 which is adapted to receive the second end 58 of the piston 54. The second end portion 68 may be received inside the first end 78 of the return spring 18. A groove 74 may be provided at the base of the second end portion 68 to retain the second end 80 of the return spring 18. The distal seal 70 has a flat, annular sealing surface 76 which is adapted to sealingly engage the first valve seat 26.

As mentioned above, the first end 78 of the return spring 18 engages the second end portion 68 of the plunger 16. The return spring 18 also has a second end 80 which may be received in a reduced diameter portion of the valve chamber 22 and engages the second annular shoulder 38. The return spring 18 is under compression between the second annular shoulder 38 and the plunger 16, to bias the plunger and the distal seal 70 away from the first valve seat 26.

FIG. 3 shows the valve 10 in an open state (e.g., non-actuated state). In the open state, the valve allows fluid to flow from the port 30 to the port 32 or vice versa. In other words, with the valve 10 in the open state, fluid flow between the ports 30, 32, through the valve chamber 22 is permitted. Specifically, in one example, in the open state the solenoid 46 in the solenoid assembly 14 may not be energized, and the piston 54 is therefore in a retracted position. In this state, the annular sealing surface 76 of distal seal 70 is spaced away from the first valve seat 26 which is located between the ports 30, 32.

FIG. 4 shows the valve 10 in closed state (e.g., actuated state). In this state the solenoid 46 is energized, and the piston 54 is therefore in an extended position, and axially moves the plunger 16 away from the open end 24 by a sufficient distance such that the sealing surface 76 of distal seal 70 sealingly interfaces with the valve seat 26 to prevent fluidic communication between the ports 30, 32 through the valve chamber 22. Thus in the sealing interfaces described herein two surfaces may be in face sharing contact to inhibit fluid flow therethrough. The extension of the piston 54 also causes the return spring 18 to be compressed into the reduced diameter portion of the valve chamber 22. The actuated state of the valve 10 is also referred to herein as the closed state.

In order to return the valve 10 to its open state (e.g., non-actuated state), the electric current to the solenoid 46 is cut off, and the return spring 18 pushes the plunger 16 toward the open end 24, causing retraction of the piston 54 to the open state of FIG. 3. In this way, the valve may be transitioned between the open and closed states depending on, for example, vehicle operating conditions.

FIGS. 5-10 illustrate a three-port valve 90 according to a second embodiment. Valve 90 includes a number of elements which are similar to elements of the valve 10, shown in FIGS. 1-4. For instance, the valve 90 includes a housing 12, a solenoid assembly 14, an O-ring 20, and a spring 18 (e.g., return spring). These components may share some similar functions and structures with the components in the valve 10. However, it will be appreciated that some structures and/or functions of these components may be varied to accommodate for the three-port arrangement.

The valve 90 again includes a plunger 16. However, the plunger 16, in the illustrated embodiment, comprises distal and proximal seals 160, 146. The valve 90 also may include O-rings 96, 98 and a snap ring 100. The snap ring 100 is designed to mate with a detent 114 (e.g., annular groove) in the housing 12, shown in FIG. 6. Specifically, the snap ring 100, when installed, axially delimits a flange 101 of the body 103 of the solenoid assembly 14. In this way, the solenoid may be held in a desired location using a removable component designed for efficient installation and removal.

The valve housing 12 has a hollow valve chamber 22 and an open end 24 through which the plunger 16 and return spring 18 are inserted. A first valve seat 26 is provided inside the valve chamber 22. In the embodiment illustrated in FIGS. 5-10, the valve chamber 22 is in the form of a cylindrical bore with one or more diameter reductions, wherein a first diameter reduction provides a first annular shoulder 28 which defines the first valve seat 26. However, other valve chamber profiles have been envisioned.

The valve housing 12 comprises second and third valve ports 30, 32 corresponding to those of the valve 90, and further comprises a first valve port 102 including an opening in the sidewall of housing 12. The first valve port 102 is located between the second valve port 30 and the open end 24. In the illustrated embodiment, the three ports 30, 32, 102 may be internally threaded, and are adapted to receive externally threaded fittings, such as quick-connect fittings as shown in U.S. Provisional Application No. 62/830,052 filed on Apr. 5, 2019. However, alternate suitable port attachment features have been contemplated.

The solenoid assembly 14 comprises an outer portion 44 which may include a first, outwardly facing end 84 and a second, inwardly facing end 86. The outer portion 44 may comprise an external housing 82 (e.g., cylindrical housing) which may be comprised of metal or plastic, and contains the coil 48 of a solenoid 46 and a portion of the piston 54, including the first end 56 thereof. Lead wires 50, 52 provide electrical energy to the coil 48, and the energized coil creates an electromagnetic field. The second end 58 of the piston 54 projects axially from the second end 86 of outer portion, into the valve chamber 22. The electromagnetic field created by the energized coil 48 causes the piston 54 to move longitudinally such that the second end 58 of the piston moves further into the valve chamber 22, away from the open end 24. As such, the piston 54 again includes a magnetically interactive material.

An annular sealing flange 104 is integrally formed at the second end 86 of the outer portion 44. The sealing flange 104 has a first, inwardly-facing sealing surface 106 which is flat and is adapted to seal against an annular sealing surface 108 of the valve housing 12, located proximate to the open end 24 of the housing 12. The annular sealing surface 108 and/or the flat sealing surface 106 includes an annular groove 110 in which the O-ring 96 is housed, to provide a fluid-tight seal.

The sealing flange 104 includes a second, externally facing surface 112, which is engaged by the resilient snap ring 100. The snap ring 100, in the illustrated example is formed as C-shaped metal ring having its outer portion received in an annular groove 114 in the open end 24. An inner portion of snap ring 100 engages the externally facing surface 112, to retain the solenoid assembly 14 in the open end 24 of the valve housing 12, with the sealing surface 106 of the flange 104 in sealed attachment to the annular sealing surface 108 of the housing.

In the illustrated embodiment, a valve sealing component 60 (e.g., cap) is a separately formed component which may be formed from plastic or metal. Specifically in one example, the valve sealing component 60 may be manufactured from a different material from the valve housing 12. For instance, the valve housing may be constructed out of a metal while the valve sealing component may be at least partially constructed out of a polymer. However, it will be appreciated that the inner and outer portions 61, 44 of the component 60 may instead be integrally formed. In this way, the manufacturing of the valve sealing component may be tuned to achieve desired material properties, tolerances, etc., if desired.

The valve sealing component 60 serves several functions, as described below. The valve sealing component 60 may include a cap sealing section 116 (e.g., valve closure cap) having a first, outer end 118 and a second, inner end 120. The cap sealing section 116 may have a generally cylindrical outer surface sized and shaped to mate with a valve housing opening 119 in the open end 24, shown in FIG. 6. To elaborate, the first end 118 engages the housing 82 of the solenoid assembly 14, along the second end 86 thereof. The first end 118 of the cap sealing section 116 and/or the second end 120 of housing 82 may be provided with an annular groove 122 in which the O-ring 98 is housed, to provide a fluid-tight seal between the inner and outer portions 61, 44 of the solenoid assembly 14. However, additional or alternative sealing mechanisms may be used, in other examples.

The cap sealing section 116 may have an outer cylindrical surface which is provided with an annular groove 124 adapted to receive O-ring 20, to further seal the open end 24 of the valve housing 12. The second end 120 of the cap sealing section 116 may be provided with a central, axially-extending sleeve portion 126 which is open at both ends and is adapted to closely receive the piston 54 with an axially sliding fit. In other words, piston 54 mates with the sleeve portion 126 of the valve sealing component 60 such that the piston can axially extend and retract therein but also seals the piston, to reduce the likelihood (e.g., prevent) unwanted fluid leakage.

The second end 120 of the cap sealing section 116 is also provided with a plurality of axially-extending struts 128 which are arranged circumferentially around sleeve portion 126. Each of the struts 128 has a first end 130 attached to the second end 120 of the cap sealing section 116 and a second end 132 attached to a valve seat 134 of the valve sealing component 60. The valve seat 134 may have annular shape, allowing the seat to sealingly interface with the distal seal 160. Furthermore, the openings 135 between the struts 128 provide fluid flow passages providing fluidic communication with first valve port 102. To elaborate, the openings 135 may be adjacent to the first port 102. In this way, the first port can maintain fluidic communication with the valve chamber while the struts strengthen the valve sealing component. The struts 128 may, in one example, be symmetrically arranged around the axis L. For instance, sequential struts may be spaced apart by 30 degrees, 45 degrees, 90 degrees, 180 degrees, etc. The number and spacing of the struts may be selected based expected operating loads in the valve's end-use environment, expected fluid flowrates, the working fluid in the end-use system, etc. For instance, adding additional struts or increasing the size of the struts may increase the structural integrity of the valve sealing component while also increasing the valve flow losses, in some cases. However, asymmetric strut arrangements have been contemplated.

The valve seat 134 of the valve sealing component 60 may comprise an annular ring having a central opening 136 which permits fluid flow between areas of the valve chamber 22 located on opposite sides of the valve seat 134. The valve seat 134 also may have a substantially cylindrical outer surface 138 which is adapted to form a seal with the inner surface of the valve chamber 22, between the first valve port 102 and the second and third valve ports 30, 32. Thus, the outer surface 138 may mate with a section 141 between (e.g., axially between) the first port 102 and the second port 30. In this way, the valve seat is located in a removable valve sealing component as opposed to the housing. Consequently, in one use-case example the valve seat may be manufactured with greater precision to provide a more robust seal. The material used to construct the valve seat may also be selected to decrease the likelihood of leaks. For instance, the valve seat 134 may be constructed out of a polymeric material while the valve housing may, for example, be constructed out of a metal (e.g., steel, aluminum, combinations thereof, etc.). Furthermore, by incorporating the valve seat 134 in the valve sealing component 60 the struts 128 can provide greater structural reinforcement to the seal and decrease the chance of unwanted valve seat deformation during valve operation.

Figure 9:
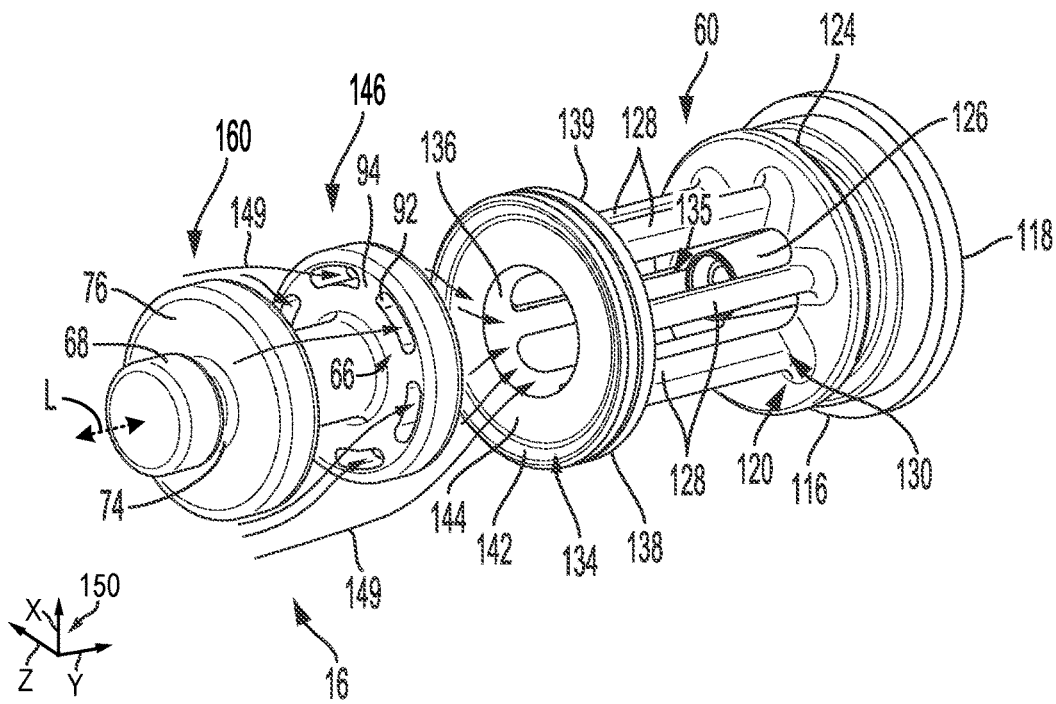
FIG. 9 is a close-up perspective view of components of the valve depicted FIG. 5.

As shown in FIG. 9, the outer surface 138 may be provided with an upstanding, continuous, circumferentially-extending rib 139 to enhance sealing between the outer surface 138 and the inner surface of the valve chamber 22. Thus, the rib 139 is designed to mate with a portion of the valve housing and to provide sealing engagement therebetween.

The valve seat 134 has a first face 140 to which the second ends 132 of the struts 128 are attached, and a second face 142 which defines a second valve seat 144, and which is adapted to form a fluid-tight seal with the proximal seal 146 of the plunger 16, as further discussed below. The second valve seat 144 is located along the longitudinal axis between the second and third valve ports 30, 32. The second valve seat 144 may be recessed relative to the second face 142.

The plunger 16 may comprise a first end portion 66, a second end portion 68, both of which may be substantially cylindrical. The distal seal 160 of the plunger 16 may comprise an annular disc provided between the end portions 66, 68, and having a greater diameter than end portions 66, 68. The first end portion 66 has an internal bore 72 which is adapted to receive the inner end 56 of the piston 54. The second end portion 68 is received inside an end of the return spring 18. A groove 74 may be provided at the base of the second end portion 68 to retain the first end 78 of the return spring 18. The distal seal 160 may have a flat, annular sealing surface 76 which is adapted to sealingly interface with the valve seat 26.

The plunger 16 may further comprise a proximal seal 146, including an annular extension which is located at an end of the first end portion 66, and which is axially spaced from the distal seal 160. The proximal seal 146, in the illustrated example, has a greater diameter than end portions 66, 68, and has a second annular sealing surface 148 adapted to sealingly interface with the second valve seat 144, described above.

Figure 10:
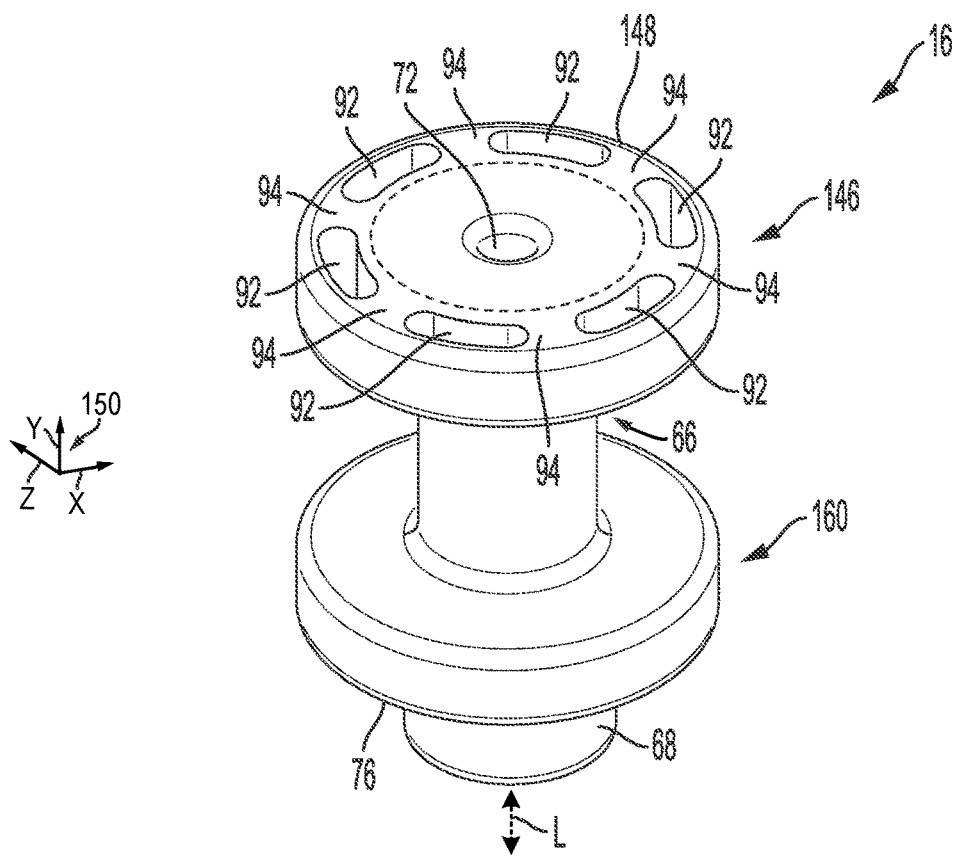
FIG. 10 is a close-up perspective view of the plunger of the valve depicted FIG. 5.
Figure 11:
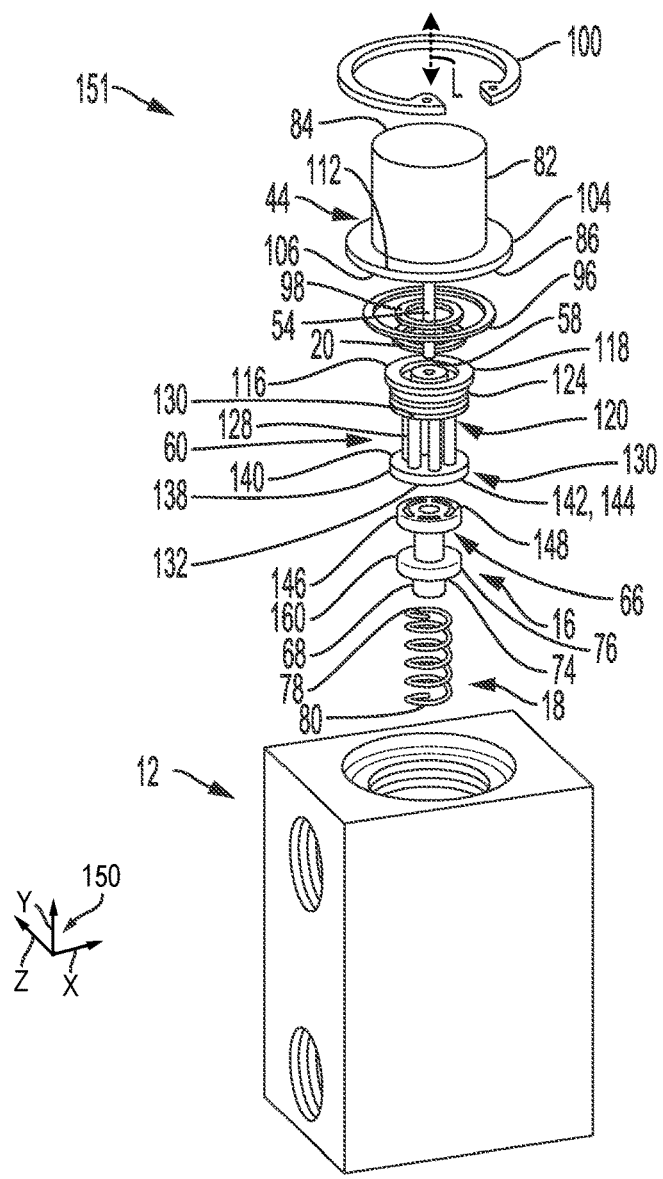
FIG. 11 is a perspective view of a four-port valve according to an embodiment, in a disassembled state.
Figure 12:
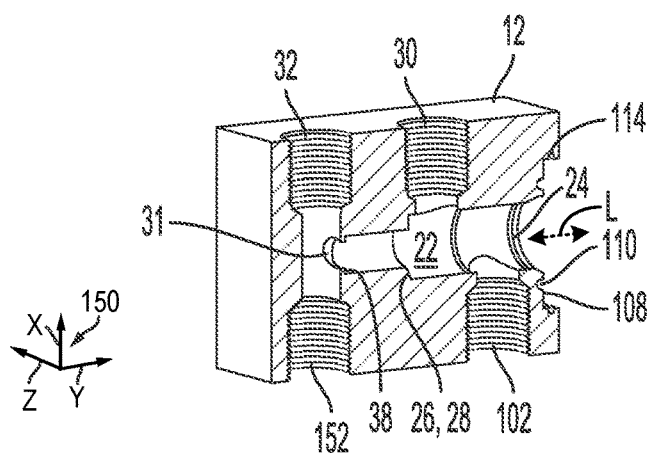
FIG. 12 is a cross-sectional view of a housing in the valve, depicted in FIG. 11.

As seen in FIGS. 9 and 10, the plunger 16 of the valve 90 may include one or more openings 92 extending through the proximal seal 146 in the axial direction, to permit fluid flow through the proximal seal 146. In the illustrated embodiment, the proximal seal 146 includes the plurality of openings 92 spaced around the circumference of the proximal seal 146. The openings 92 are in the form of elongate slots (e.g., arcuate slots) which are separated by webs 94 which connects the inner and outer portions of the proximal seal 146. The width of each web 94 (measured along the circumference of the proximal seal 146) may be less than the length of each opening (also measured along the circumference of the proximal seal 146), to increase (e.g., maximize) the area through which fluid can flow through the proximal seal 146. The openings 92 in the plunger 16 therefore serve to increase the fluid flowrate through the valve when the proximal seal 146 of the plunger is spaced away from the valve seat 134 in the valve sealing component 60. However, the openings 92 are blocked via the valve seat 134 when the plunger 16 is seated on the seat.

As can be seen in FIG. 10, the openings 92 extend through the annular sealing surface 148 of the proximal seal 146, the inner edge of which is shown with a dotted line. As mentioned above, the first end 78 of the return spring 18 engages the second end portion 68 of the plunger 16. The return spring 18 also has a second end 80 which is received in a reduced diameter portion of the valve chamber 22 and engages the second annular shoulder 38. The return spring 18 is under compression between the second annular shoulder 38 and the plunger 16, to bias the distal seal 160 away from the first valve seat 26, and to bias the proximal seal 146 toward the second valve seat 144. The return spring 18 therefore allows the valve to transition between states without solenoid energization, if wanted.

Figure 7:
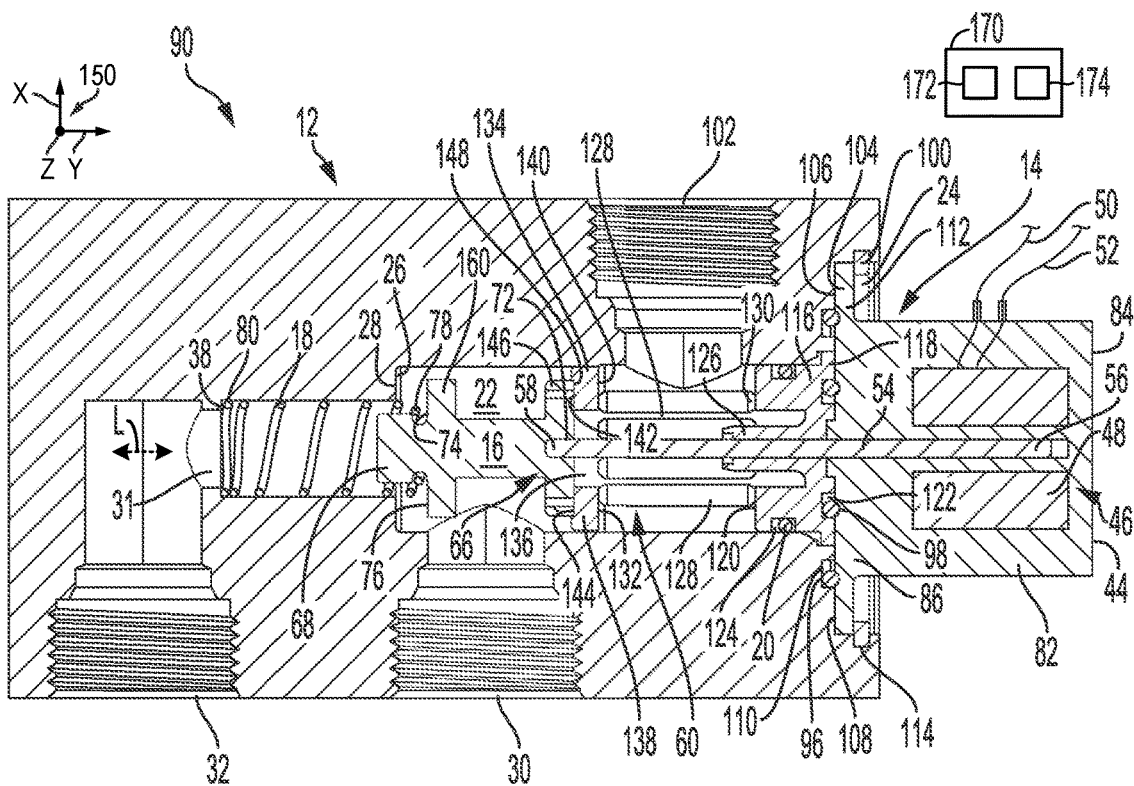
FIG. 7 is a longitudinal cross-sectional view of the valve depicted FIG. 5 in a first state.

FIG. 7 shows the valve 90 in a first state. In the first state, the valve inhibits fluid flow between the first port 102 and the second port 30. Thus, the first state may a closed state with regard to the first and second ports. Furthermore, the first state may be a non-actuated state. Thus, in the non-actuated state, the solenoid 46 is not energized, and the piston 54 is in its retracted position. In this state, the annular sealing surface 76 of the distal seal 160 is spaced away from the valve seat 26. With the valve 90 in the first state, fluid flow between the second and third ports 30, 32, through a portion of the valve chamber 22, is permitted. Also in the first state, the annular sealing surface 148 of the proximal seal 146 is sealed with the second valve seat 144, thereby preventing fluid flow through the central opening 136 of the valve seat 134. Therefore, in the non-actuated state of the valve 90, fluid flow between the second and third valve ports 30, 32 is permitted, while fluid flow between first valve port 102 and the second and third valve ports 30, 32 is prevented. Additionally, due to the annular sealing surface 148 is sealed with the second valve seat 144 in the first state, the openings 92 through the proximal seal are blocked by the second valve seat 144.

Figure 8:
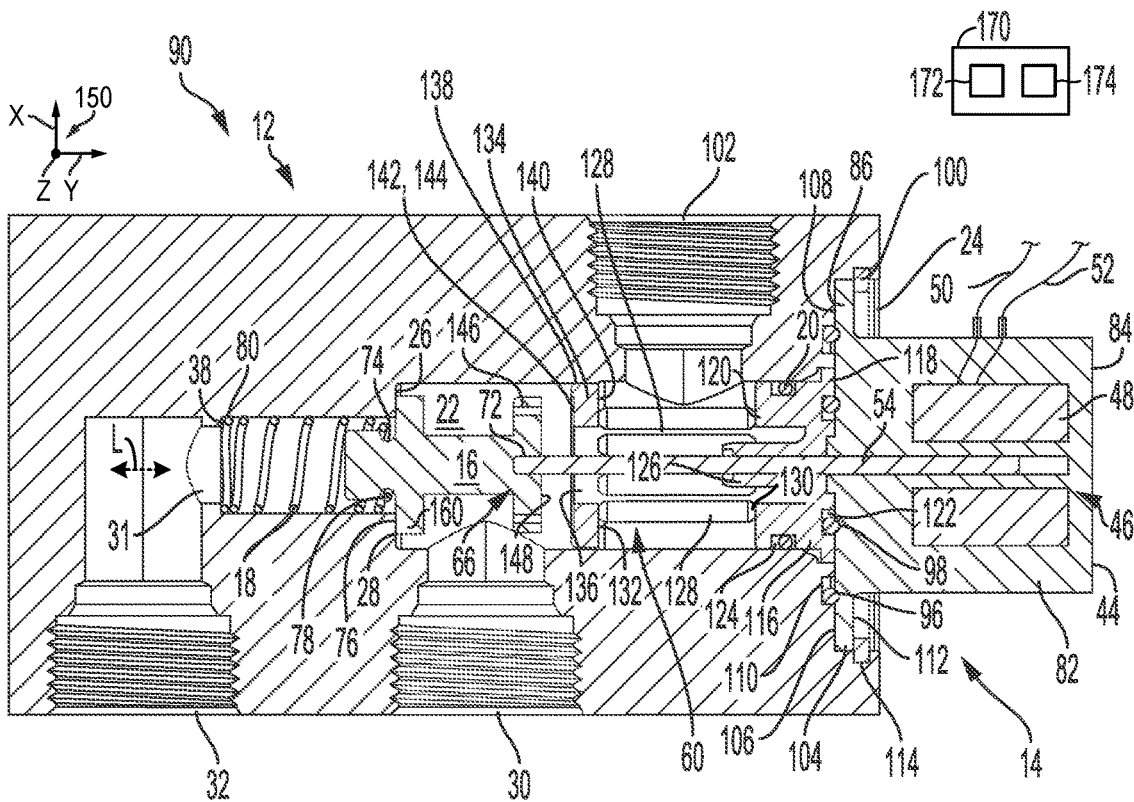
FIG. 8 is a longitudinal cross-sectional view of the valve depicted FIG. 5 in a second state.

FIG. 8 shows the valve 90 in a second state (e.g., actuated state). In this state the solenoid 46 is energized, and the piston 54 is therefore in its extended position, and axially moves the plunger 16 away from the open end 24 by a sufficient distance such that the sealing surface 76 of distal seal 160 sealingly interfaces with the first valve seat 26 to prevent fluidic communication between the second and third ports 30, 32 through the valve chamber 22. Also in the second state, the sealing surface 148 of the proximal seal 146 is spaced away from the second valve seat 144, so as to permit fluid flow between the second valve port 30 and the first valve port 102. Thus, the second state may be an open state with regard to the first port 102 and the second port 30.

When the valve is in the second state (e.g., actuated state), as shown in FIG. 8, the annular sealing surface 148 is spaced away from the second valve seat 144, thereby permitting fluid flow through the openings 92 of the proximal seal 146. Therefore, the openings 92 effectively increase the cross-sectional area of the valve chamber 22 through which fluid may flow between the first and second valve ports 102, 30. The flow of fluid around and through the proximal seal 146, and to the central opening 136 of the valve seat 134 is indicated via arrows 149 in FIG. 9. In this way, the flowrate through the valve can be increased and flow losses in the valve are correspondingly reduced.

As shown in FIG. 8, the extension of the piston 54 in the actuated state also causes the return spring 18 to be compressed into the reduced diameter portion of the valve chamber 22. As such, the valve can return to the non-actuated state where the piston is retracted without force from the solenoid. Consequently, valve control efficiency may be increased. To elaborate, in order to return the valve 90 to its non-actuated state, the electric current to solenoid 46 is cut off, and the return spring 18 pushes the plunger 16 toward the open end 24, causing retraction of the piston 54 to the non-actuated state of FIG. 7.

In the valve 90, shown in FIGS. 5-10, the second valve port 30 may be an inlet port and the first port 102 and the third valve port 32 may be outlet ports, in one example. Alternatively, in other examples, the second valve port 30 may be an outlet port and the first port 102 and the third valve port 32 may be inlet ports.

FIGS. 7-8 depict a controller 170. The controller 170, which may be included in a vehicle, is in electronic communication (e.g., wired and/or wireless communication) with the solenoid assembly 14 via the lead wires 50, 52 and/or other suitable devices. As such, in one example, the controller 170 may be included in a control system. Thus, the controller 170 may be configured to control the solenoid assembly 14 in the valve 90 based on signals from sensors and/or other vehicle systems, for instance. The controller 170 may include memory 172 holding known computer readable storage media (e.g., as random access memory, read only memory, keep alive memory, non-transitory memory, etc.). The memory 172 may therefore comprise code corresponding to the fluid circulation system control methods, techniques, etc., described herein. Thus, the code stored in the memory 172 is executable by a processor 174. In some examples, the controller 170 may include more than one control device, each in communication with one another. It will also be appreciated that a controller similar to the controller 170, shown in FIGS. 7-8, may also be in electronic communication with the other solenoid assemblies in the other valves described herein.

The controller 170 may be designed to implement a valve control strategy. Therefore, the following control commands, steps, etc. may be implemented as code stored in non-transitory memory 172 executable by the processor 174. In one example, a valve control strategy may include retracting the plunger 16 to sealingly interface with the proximal seal 146 with the valve seat 134 in the valve sealing component 60 through de-energization of the solenoid 46 in the solenoid assembly 14. To de-energize the solenoid 46, the electrical energy delivered to the solenoid 46 via the lead wires 50, 52 or other suitable electrical connections is substantially discontinued. Conversely, the valve control strategy may further include extending the plunger 16 to sealingly disengage the proximal seal 146 of the plunger from the valve seat 134 in the valve sealing component 60. To extend the plunger 16 the solenoid 46 is energized by way of electrical energy transferred to the solenoid 46 via the lead wires 50, 52. Thus, the valve 90 may transition between an energized state and a de-energized state depending on operating conditions in the system in which it is deployed to route fluid to desired locations (e.g., coolant loops, heat exchangers, pumps, etc.) in the system. In this way, the valve can be utilized to, for example, cool various locations in a vehicle, motor, engine, etc., when desired.

FIGS. 11-16 illustrate a four-port valve 151 according to a third embodiment. The valve 151 may have similar structural and functional features as the three-port valve 90 described above, except that it includes a fourth valve port 152. Therefore, unless otherwise indicated below, the above description of the elements of the three-port valve 90 also applies equally to the four-port valve 151. As such, redundant description is omitted for brevity.

The fourth valve port 152 in the housing 12 is in fluidic communication with the third valve port 32, and communicates with the valve chamber 22 through the opening 31 in the end wall of the valve chamber 22, opposite to the open end 24. Fluidic communication exists between the third and fourth valve ports 32, 152 in all states of the valve 151.

It can be seen from the drawings that the sealing surfaces 76, 148 of seals 160, 146, and corresponding first and second valve seats 26, 144, are not comprised of transversely extending surfaces (e.g., perpendicular to the axial direction), but instead are sloped from the transverse direction and have a truncated cone shape. However, other seat profiles have been envisioned. Although not shown in the drawings, it will be appreciated that the proximal seal 146 may include openings 92 which extend through the annular sealing surface 148 of the proximal seal 146.

Figure 13:
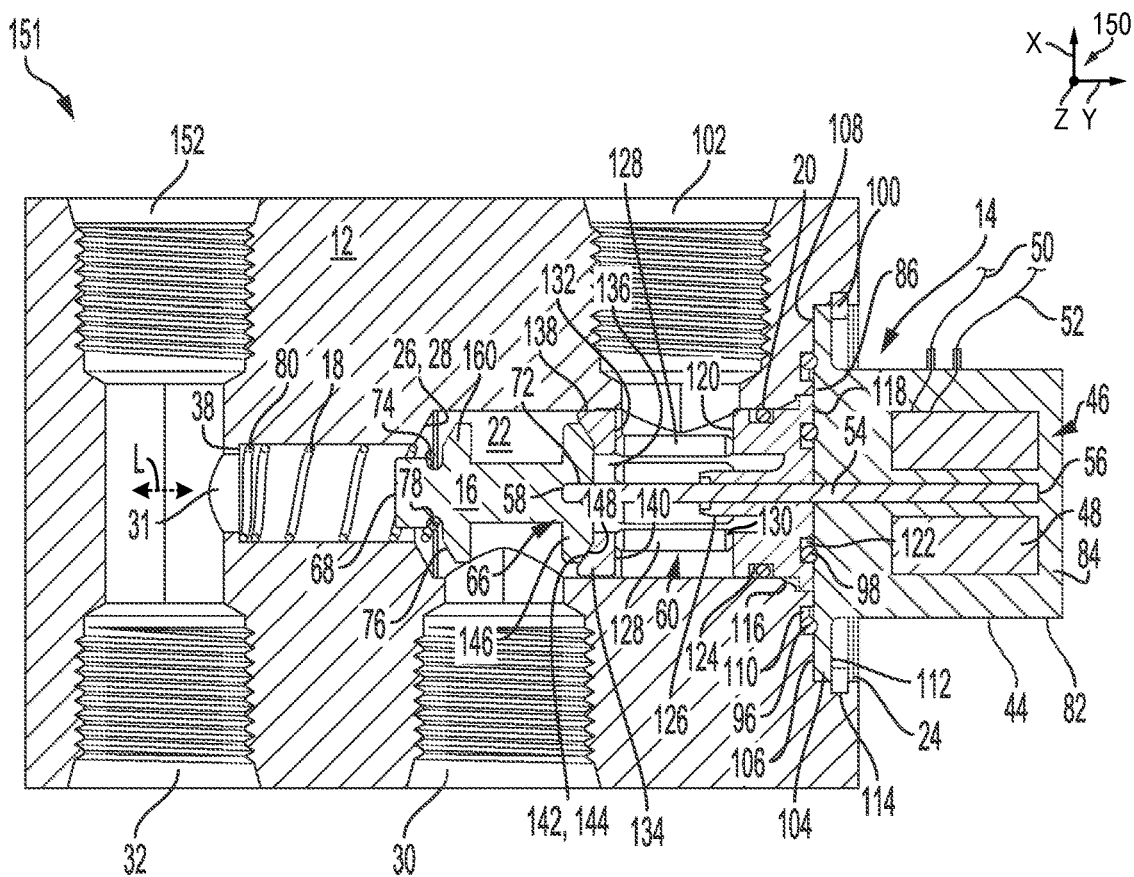
FIG. 13 is a longitudinal cross-sectional view of the valve depicted FIG. 11, in a first state.

FIG. 13 shows the valve 151 in a first state (e.g., non-actuated state). In this state, the solenoid 46 is not energized, and the piston 54 is in its retracted position. In this state, the annular sealing surface 76 of the distal seal 160 is spaced away from the first valve seat 26. With the valve 151 in this state, fluid flow is permitted between the second valve port 30 and the second and fourth valve ports 32, 152, through the valve chamber 22. Also in this state, the annular sealing surface 148 of the proximal seal 146 is sealed on the second valve seat 144, thereby preventing fluid flow through the central opening 136 of the valve seat 134. Therefore, in the non-actuated state of the valve 151, fluid flow between the first valve port 102 and the second, third, and fourth valve ports 30, 32, 152 is prevented.

Figure 14:
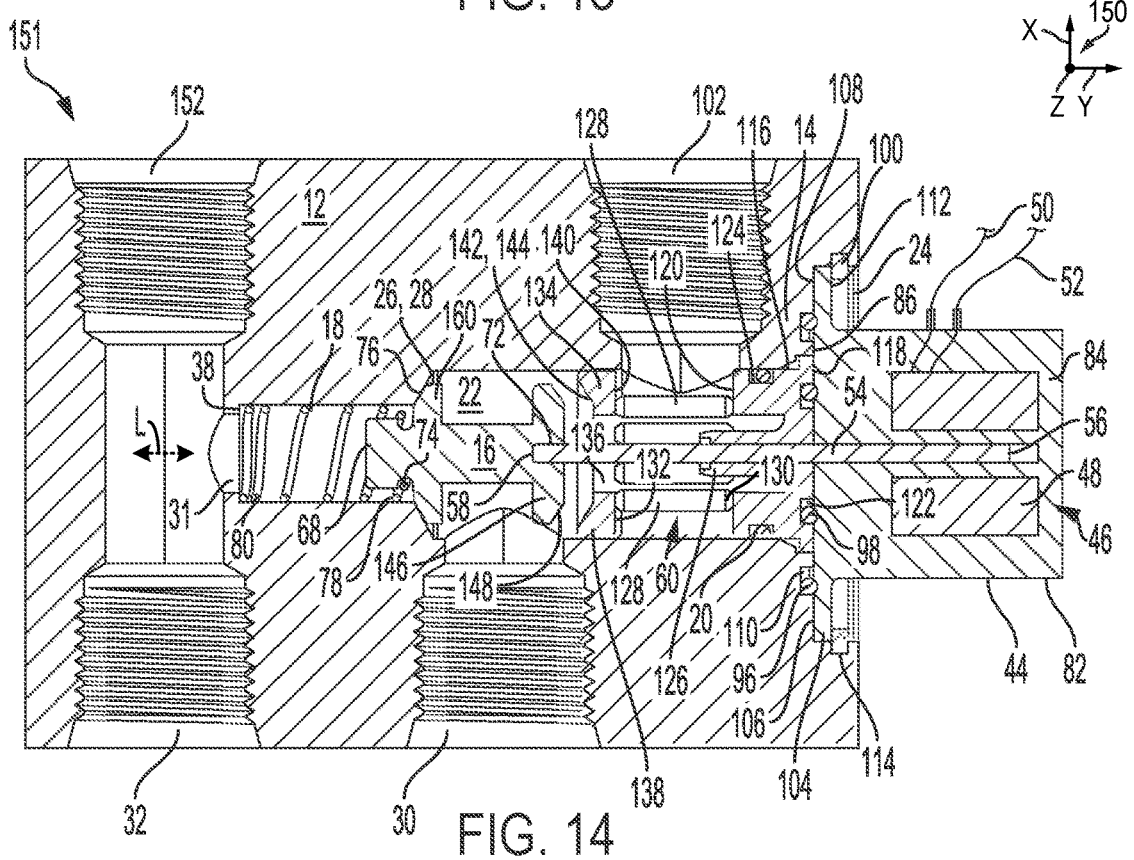
FIG. 14 is a longitudinal cross-sectional view of the valve depicted in FIG. 11, in a second state.

FIG. 14 shows the valve 151 in a second state (e.g., actuated state). In this state, the solenoid 46 is energized, and the piston 54 is therefore in an extended position. The piston 54 axially moves the plunger 16 away from the open end 24 by a sufficient distance such that the sealing surface 76 of the distal seal 160 sealingly interfaces with the first valve seat 26 to prevent fluidic communication between the second valve port 30 and the third and fourth valve ports 32, 152 through the valve chamber 22. Also in this state, the sealing surface 148 of the proximal seal 146 is spaced away from the second valve seat 144, to permit fluid flow between the second valve port 30 and the first valve port 102. The extension of the piston 54 also causes the return spring 18 to be compressed into the reduced diameter portion of the valve chamber 22.

In one example, in the valve 151, the second valve port 30 may be an inlet port and the first port 102 may be an outlet port. However, in another example, the second valve port 30 may be an outlet port and the first port 102 may be an inlet port. In either example configuration, the third and fourth ports 32, 152 may each be an inlet or outlet port. In order to return the valve 151 to its non-actuated state, the electric current to the solenoid 46 is cut off, and the return spring 18 pushes the movable plunger 16 toward the open end 24, causing retraction of the piston 54 into the non-actuated state of FIG. 13.

Figure 15:
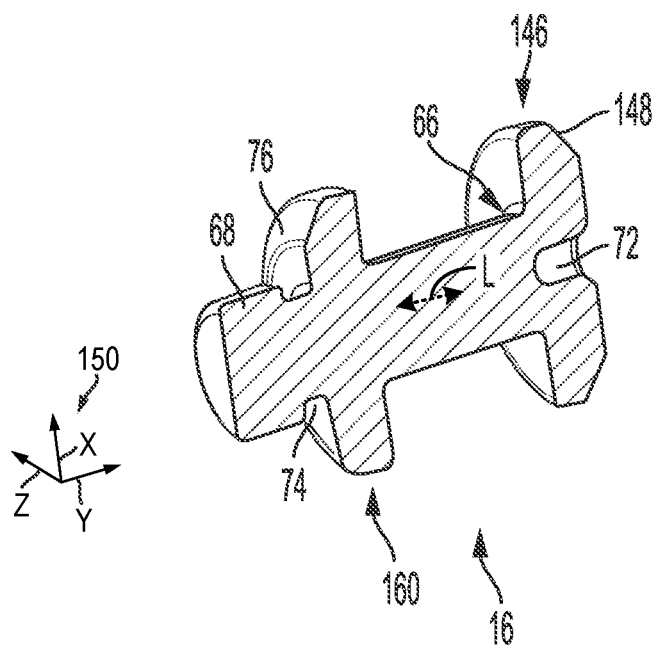
FIG. 15 is a close-up cross-sectional view of a plunger in the valve depicted in FIG. 11.
Figure 16:
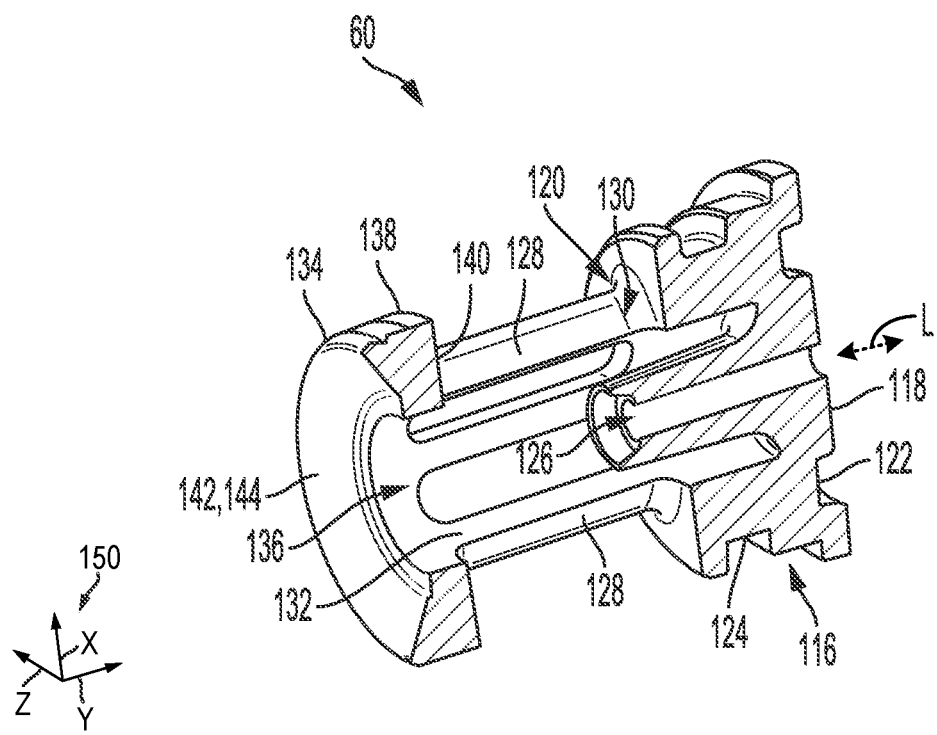
FIG. 16 is a close-up cross-sectional view of a valve sealing component in the valve depicted in FIG. 11.

FIGS. 15 and 16 illustrate cross-sections of the plunger 16 and the valve sealing component 60, respectively. The cutting planes for both cross-sectional views extend through central axes of each component.

Turning specifically to FIG. 15, the plunger's distal seal 160 includes the annular sealing surface 76 that is tapered. To elaborate, annular sealing surface tapers in radial outward directions. The proximal seal 146 also includes the annular sealing surface 148 tapering as the surface progresses radially outward. The angle of these tapered surfaces may match the tapering of the corresponding valve seat. To elaborate, the angle of the valve seat 144 shown in FIG. 16 corresponding to the angle of the proximal seal 146 shown in FIG. 15. Angling the valve's sealing surfaces in this manner may decrease the likelihood of valve leaks and provides a more stable seal.

Figure 17:
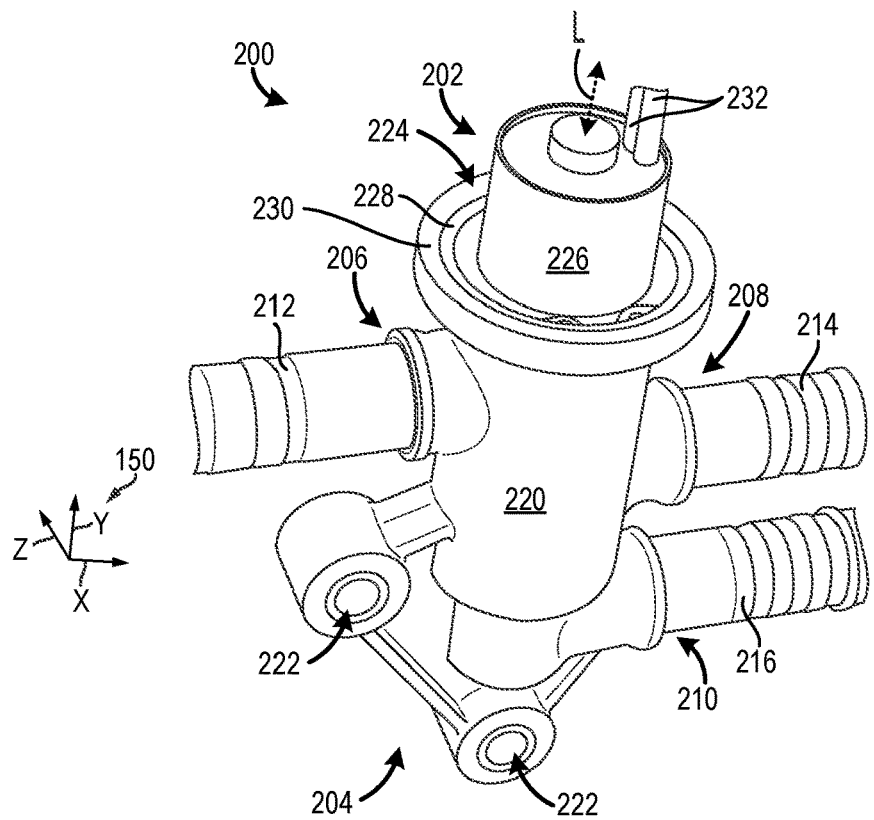
FIG. 17 is a perspective view of another embodiment of a valve.

FIG. 17 illustrates another embodiment of an electrically actuated valve 200. The valve 200 again includes a solenoid assembly 202 and a valve housing 204, similar to the valve shown in FIG. 5. As such, redundant description of overlapping features is omitted for brevity. The valve housing 204 includes a first, second, and third port 206, 208, 210 with a first, second, and third conduit 212, 214, 216 extending from the respective ports.

The valve housing 204 includes a curved outer surface 220 which has a cylindrical shape, in the illustrated example. The curved housing may reduce the valve's weight in comparison to the previously described housing designs with polygonal shapes. However, other valve housing profiles have been envisioned. The valve housing 204 may also include mounting openings 222, allowing the valve to be attached to a desired component in the system in which it is deployed (e.g., a vehicle cooling system). To elaborate, one of the mounting openings is positioned on a side of the housing opposing the second and third ports 208, 210 to increase the valve's compactness. The other mounting opening is positioned on a side of the housing opposing the side of the housing adjacent to the solenoid assembly 202.

However, alternate mounting opening arrangements have been envisioned. The valve housing 204 includes a side 224 (e.g., upper side) where a body 226 of the solenoid assembly 202 resides. A snap ring 228 mating with a recess in the housing 204 allows the solenoid assembly 202 to be axially retained in the housing 204. To elaborate, the snap ring 228 axially retains an exterior flange 230 of the body 226 of the solenoid assembly, shown in FIG. 18.

Lead wires 232 are shown extending from the solenoid assembly 202. As previously discussed, a controller (e.g., the controller 170, shown in FIGS. 7-8) and an electrical energy source (e.g., electrical energy source 49, shown in FIG. 3) may control the valve and provide electrical energization of the solenoid by way of the lead wires.

Figure 18:
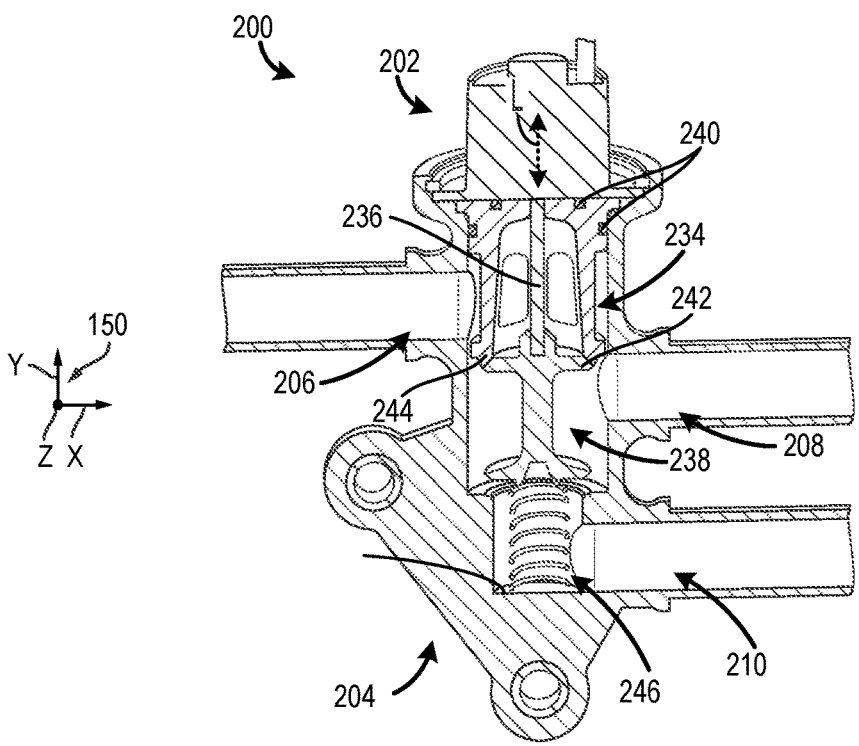
FIG. 18 is a cross-sectional view of the valve depicted in FIG. 17.

FIG. 18 shows a cross-sectional view of the valve 200. The cutting plane for the cross-sectional view extends through the valve's central axis L. The valve housing 204 and solenoid assembly 202 are again shown along with a valve sealing component 234. The solenoid assembly 202 includes a piston 236 coupled to a plunger 238. O-rings 240 seated in recesses in the valve sealing component 234 allow the valve sealing component to be sealingly coupled to the housing 204. The valve 200 is in a de-energized configuration in FIG. 18 where a proximal seal 242 in the plunger 238 is sealingly interfacing with a valve seat 244 in the valve sealing component 234. In this way, fluidic communication between the first port 206 and the second port 208 is inhibited while fluidic communication between the second port and the third port 210 is permitted. Additionally, a spring 246 is arranged between and coupled to the plunger 238 and a surface 248 in the housing 204. The spring 246 is specifically shown in an uncompressed state in FIG. 18. However, when the valve is in an energized state, the spring 246 will compress, allowing the plunger to return to the retracted position when valve energization ceases.

Figure 19:
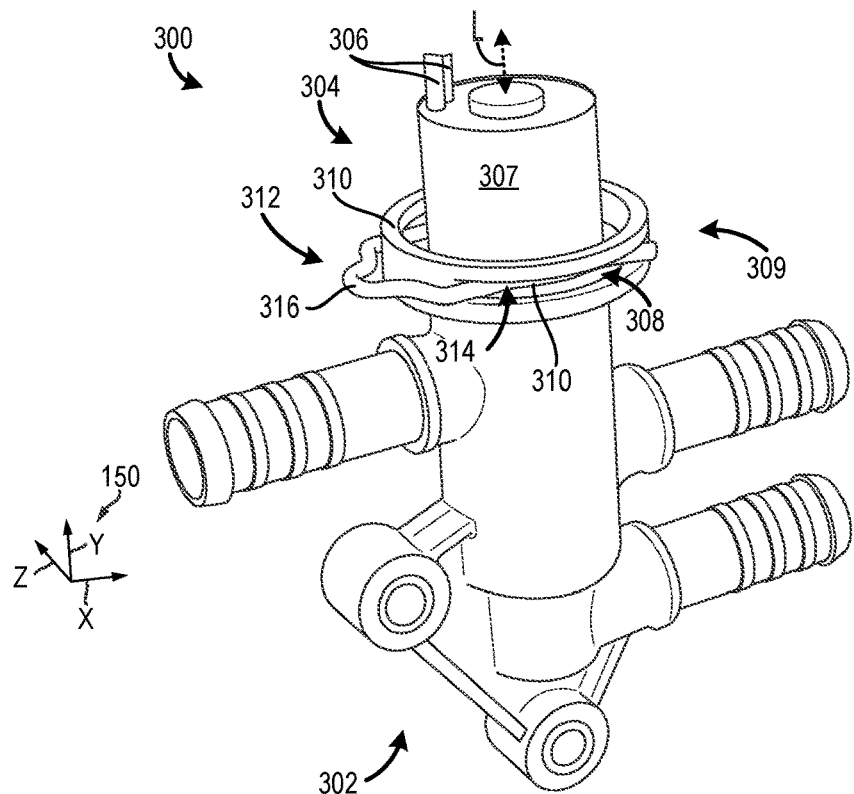
FIG. 19 is a perspective view of another embodiment of a valve in a first state.

FIG. 19 shows yet another embodiment of an electrically actuated valve 300. The valve 300 includes a similar configuration to the valve 300, shown in FIGS. 17-18. For instance, the valve 300 again includes a housing 302 and a solenoid assembly 304 with lead wires 306 extending therefrom and including a body 307. However, the housing 302 includes slits 308 with extensions 310 of a retaining clip 312 mating therewith. The slits 308 are included in an annular section of the housing 302 and extend from an outer portion of the housing to an inner portion of the housing to allow the clip to slide through the slits and retain the solenoid assembly 304. The slits also extend down opposing sides of the annular section of the housing, in the illustrated embodiment.

Figure 20:
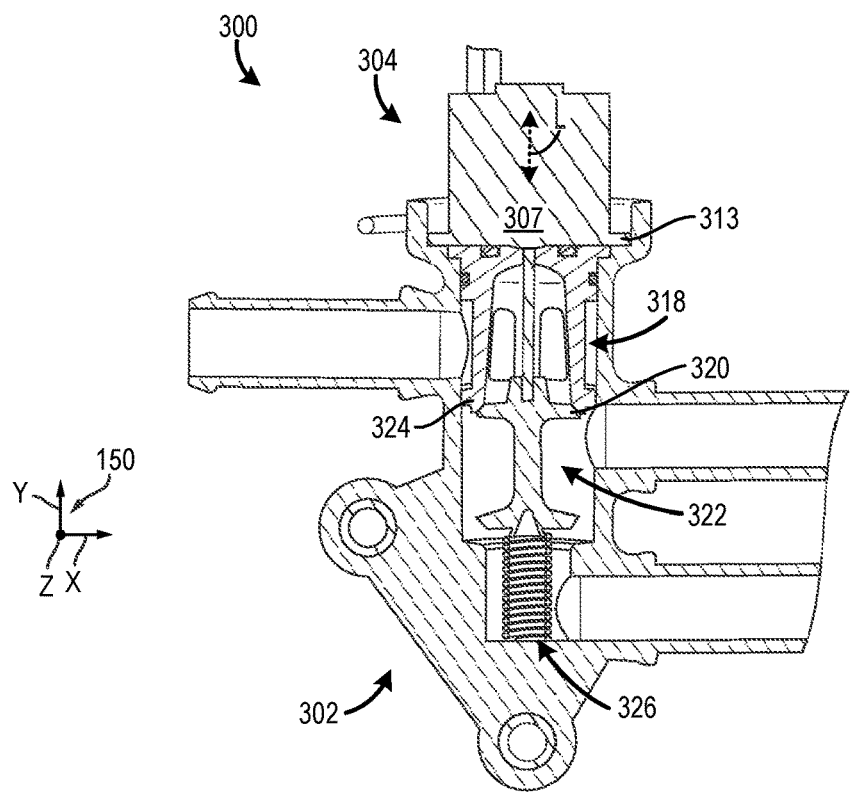
FIG. 20 is a cross-sectional view of the valve depicted in FIG. 19.

The retaining clip 312 specifically functions to axially delimit an exterior flange 313, shown in FIG. 20, of the solenoid assembly body 307. The extensions 310 of the retaining clip 312 therefore include inwardly extending sections 314 adjacent to the exterior flange 313, shown in FIG. 20. The clip 312 also includes an end 316 where the extensions 310 converge, allowing the clip to be grasped and efficiently inserted and removed from the valve housing 302. At the other end 309 of the clip 312, the extensions 310 are cantilevered and are spaced away from one another. Additionally, the extensions 310 of the clip 312 may have circular or oval cross-sections to allow the clip to be smoothly inserted into the slits 308, in some examples. However, the extensions of the clip may have polygonal cross-sections, in other examples. It will also be appreciated that the extensions of the clip may be flexible to allow the extensions to bend away from one another during clip installation and then return to their neutral position when the clip is in its desired installation position.

FIG. 20 shows a cross-sectional view of the valve 300. The cutting plane for the cross-sectional view extends through the valve's central axis L. The valve housing 302 and solenoid assembly 304 are again shown along with a valve sealing component 318. A proximal seal 320 in a plunger 322 is also shown sealed against a valve seat 324 in the valve sealing component. FIG. 20 again shows a spring 326 residing between the distal end of the plunger 322 and an interior surface of the valve housing 302.

Figure 21:
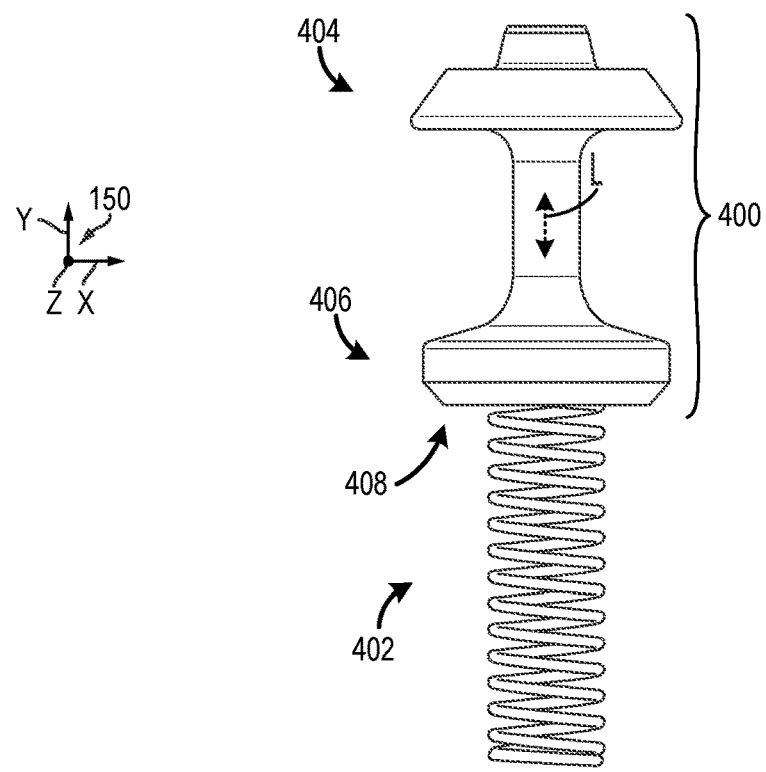
FIG. 21 is a side view of an example of a plunger and spring.
Figure 22:
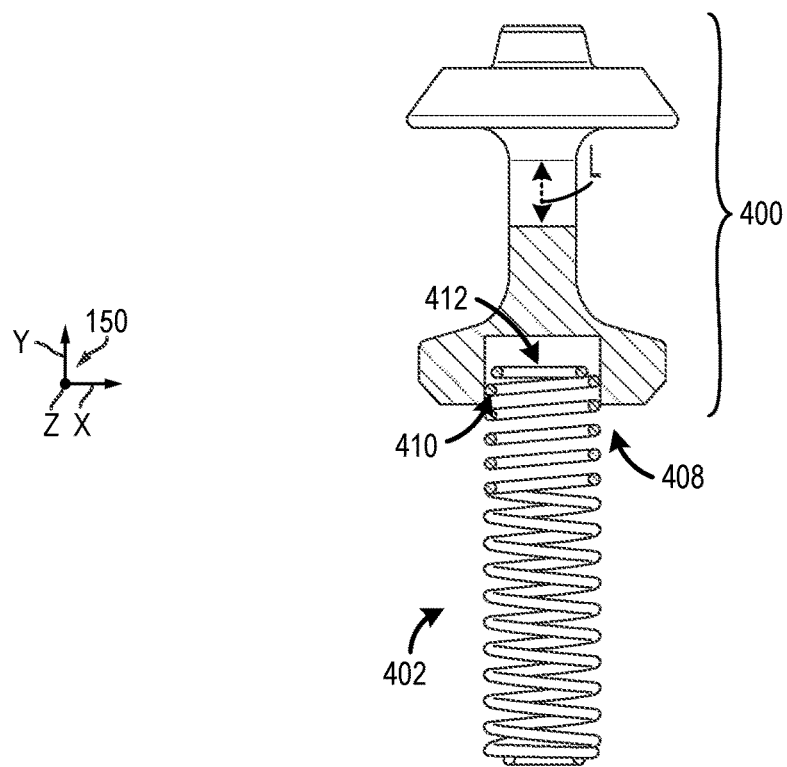
FIG. 22 is a cross-sectional view of the plunger and spring depicted in FIG. 21.

FIGS. 21-22 show another example of a plunger 400 and a spring 402 that may be included in any of the valve designs described herein. FIG. 21 is a side view of the plunger 400 and spring 402 while FIG. 22 is a cross-sectional view with a cutting plane extending through the central axis of the plunger 400. Turning to FIG. 21 showing the plunger 400 with a proximal seal 404 and a distal seal 406 with the spring 402 residing in a distal end 408 of the plunger 400.

The cross-sectional view in FIG. 22 depicts a recess 410 in the distal end 408 of the plunger 400 where an end 412 of the spring 402 is arranged. In one example, the end 412 of the spring may be coupled to the recess via welding, an interference fit, or other suitable attachment technique. However, in other examples, the spring may not be coupled to the recess. The recess 410 may be cylindrical in shape, similar to the outer shape of the spring 402. Coupling the spring and the plunger 400 in this manner allows the spring to be more reliably retained in the plunger 400 in comparison to an attachment configuration where the spring is coupled to the plunger via a cylindrical extension positioned in the interior opening of the spring. Consequently, the chance of spring misalignment and, in some cases, degradation may be reduced.

Figure 23:
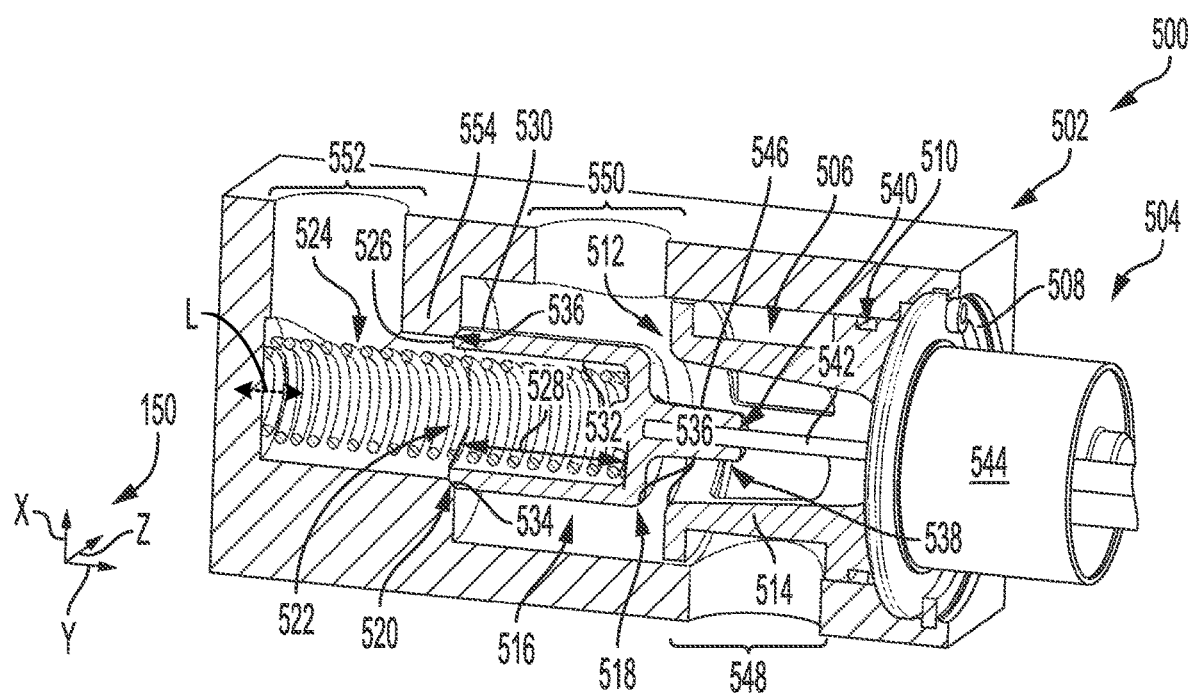
FIGS. 23-24 are cross-sectional views of another embodiment of a valve in different states.
Figure 24:
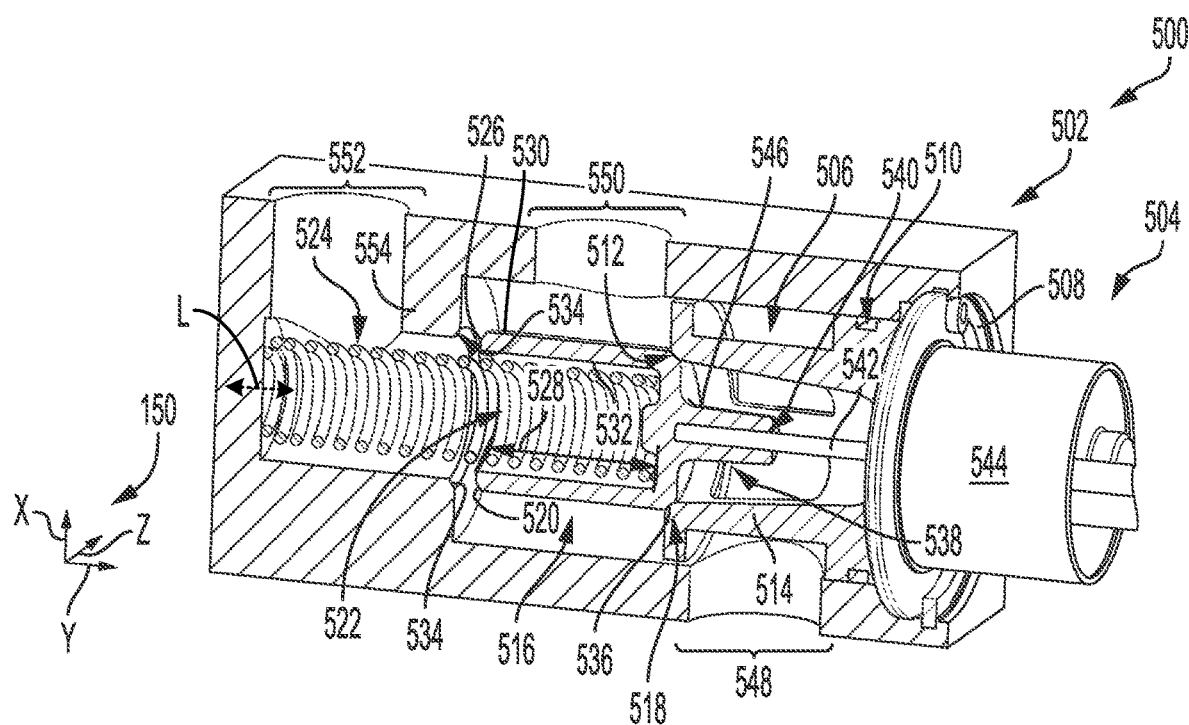

FIGS. 23-24 show another embodiment of a valve 500. The valve 500 again includes a housing 502, a solenoid assembly 504, and a valve sealing component 506. The solenoid assembly 504 is again secured in the housing 502 via a snap ring 508. Furthermore, the valve sealing component 506 again includes a cap sealing section 510 and a seat 512 with struts 514 extending therebetween. These components share some analogous functional and structural features with the components of the previously described valves. Therefore, repeated description of the analogous features omitted.

The valve 500 additionally includes a plunger 516 with a proximal seal 518 and a distal seal 520. The plunger 516 additionally includes a recess 522 in which a portion of a spring 524 resides. To elaborate, the recess 522 depicted in FIGS. 23-24, extends from a distal end 526 of the plunger 516 to an axial location adjacent to the proximal seal 518. In this way, the axial length 528 of the recess 522 is increased in comparison to the recess 410 of the embodiment of the plunger 400, shown in FIG. 22. This arrangement therefore allows the spring 524 to be robustly retained in the plunger 516, thereby reducing the chance of spring misalignment and lateral deformation. In the illustrated embodiment, the plunger 516 may have a substantially cylindrical or tapered cylindrical outer surface 530. The plunger 516 also may have a substantially cylindrical or tapered cylindrical inner surface 532 which enables the spring 524 to mate therein. Radial cross-sections of the plunger in this region therefore exhibit an annular shape. Providing a plunger profiled in this manner increases the plunger's structural integrity while also achieving greater spring retention. However, other profiles of the plunger have been contemplated, such as a plunger with a cylindrical interior surface and one or more polygonal faces on its outer surface, for instance.

The plunger's proximal seal 518 and distal seal 520 reside on the outer surface 530. The seals are again designed to engage valve seats 512, 534 in different valve configurations to vary the valve's flow control. The seals and valve seats also again include interfacing surfaces 536 arranged at a bias with regard to axis L. In other examples, the seals and seats may be arranged perpendicular to the axis L, for instance.

The plunger 516 additionally includes an extension 538 with an opening 540 mated with a piston 542 of the solenoid assembly 504. The extension 538 specifically extends axially toward a body 544 of the solenoid assembly 504. The extension 538 has a greater length than the end portions of the other plunger embodiments described herein, allowing the connection between the plunger 516 and the piston 542 to be strengthened. The likelihood of off-axis plunger movement is therefore decreased. The outer surface 546 of the extension 538 may also have a cylindrical or tapered cylindrical shape to reduce valve flow losses.

Turning specifically to FIG. 23 showing the valve 500 in a first state (e.g., energized state) where flow between a first port 548 and a second port 550 is permitted while flow between the second port 550 and a third port 552 is inhibited. Therefore, in the first state, the plunger 516 is spaced away from the valve sealing component 506 and the proximal seal 518 is decoupled from the valve seat 512 and the distal seal 520 is conversely in sealing engagement with the valve seat 534 in the housing 502. The valve seat 534 in the housing 502 is specifically located on an inwardly extending section 554 of the housing positioned axially between the second port 550 and the third port 552. In this way, fluid flow between the second port 550 and the third port 552 is blocked while fluid flow between the first port 548 and the second port is permitted.

FIG. 24 shows the valve 500 in a second state (e.g., de-energized state). In the second state, the proximal seal 518 in the plunger 516 is mated with the valve seat 512 in the valve sealing component 506 while the plunger's distal seal 520 is spaced away from the valve seat 534 in the housing 502. Thus, in the second valve state, fluidic communication between the second port 550 and the third port 552 is permitted while fluidic communication between the first port 548 and the second port is inhibited. In this way, the valve can be reconfigured with different flow control schemes.

Figure 25:
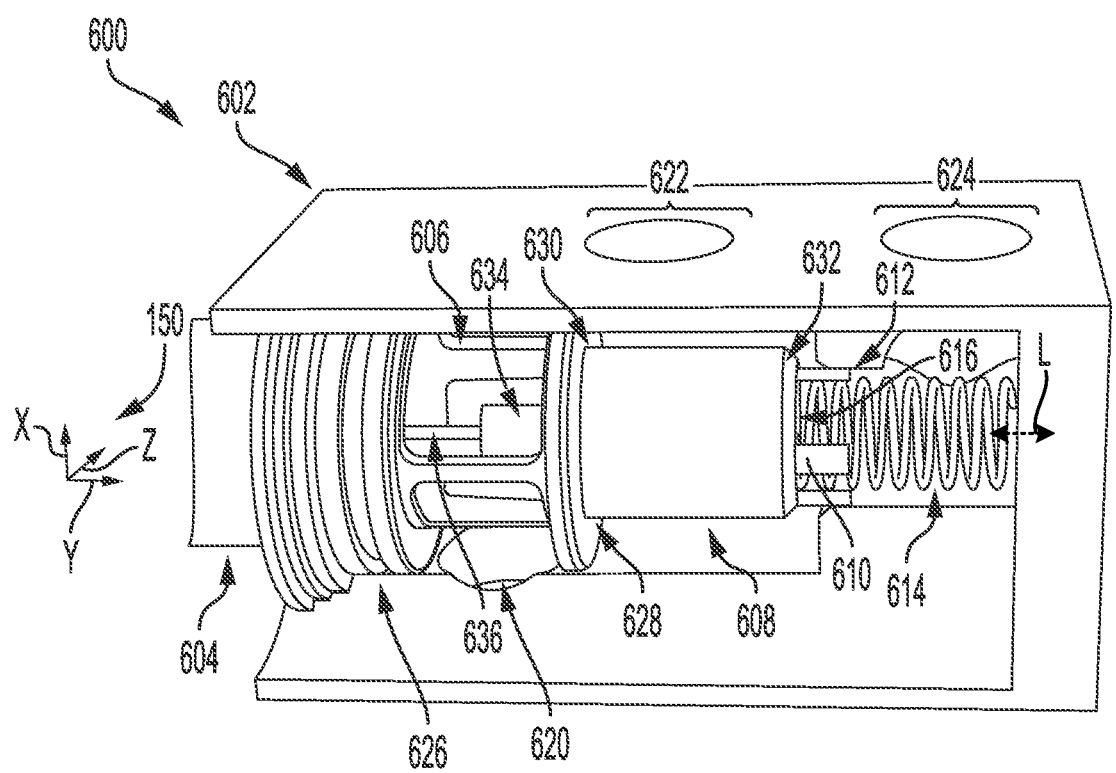
FIGS. 25-26 are cross-sectional views of yet another embodiment of a valve in different states.
Figure 26:
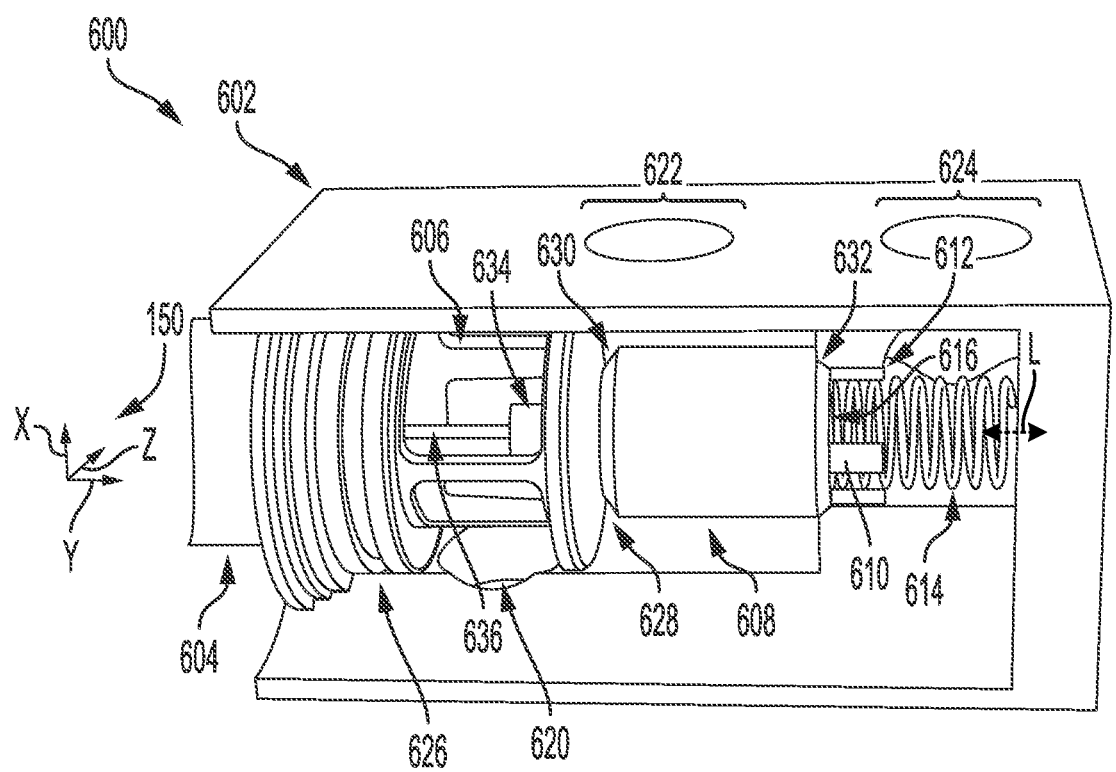

FIGS. 25-26 show another embodiment of a valve 600. The valve 600 again comprises a housing 602, a solenoid assembly 604, a valve sealing component 606, and a plunger 608. The housing 602 again includes a first port 620, a second port 622, and a third port 624. However, the valve may be include additional ports, in other embodiments. The valve sealing component 606 additionally includes a cap sealing section 626 and a valve seat 628. The plunger 608 also includes a proximal seal 630, a distal seal 632, and an extension 634 mated with the piston 636. These valve components have some similar structural and functional features in relation to the components in the valve 500, depicted in FIGS. 23-24. Redundant description of these features is therefore omitted.

However, the valve sealing component 606 includes tabs 610 at a distal end 612. The tabs 610 serve to further retain a spring 614 to reduce the chance of spring misalignment during assembly and valve actuation. The tabs 610 also may have an arcuate shape that can allow the spring to be smoothly guided into a recess 616 of the valve sealing component 606. Additionally, the tabs 610 may be symmetrically arranged around the valve sealing component's central axis L, in one embodiment. However, in other embodiments, the tabs may have an asymmetric arrangement have also been envisioned. The axial and arc lengths of the tabs may be selected based on factors such as a profile of the valve's interior cavity and the desired spring retention characteristics of the plunger, for example.

Figure 27:
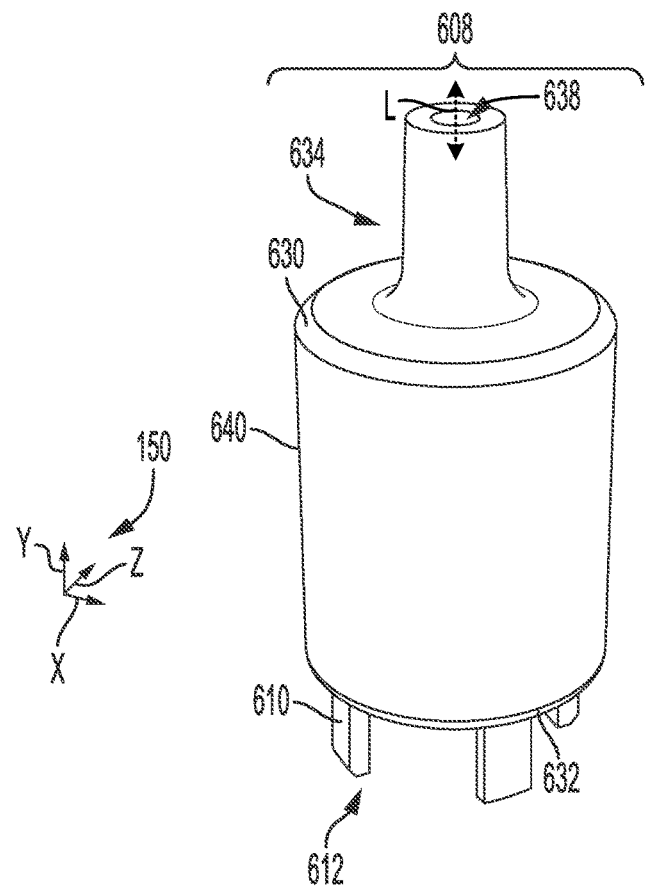
FIGS. 27-28 are detailed views of a plunger included in the valve depicted in FIGS. 25-26.
Figure 28:
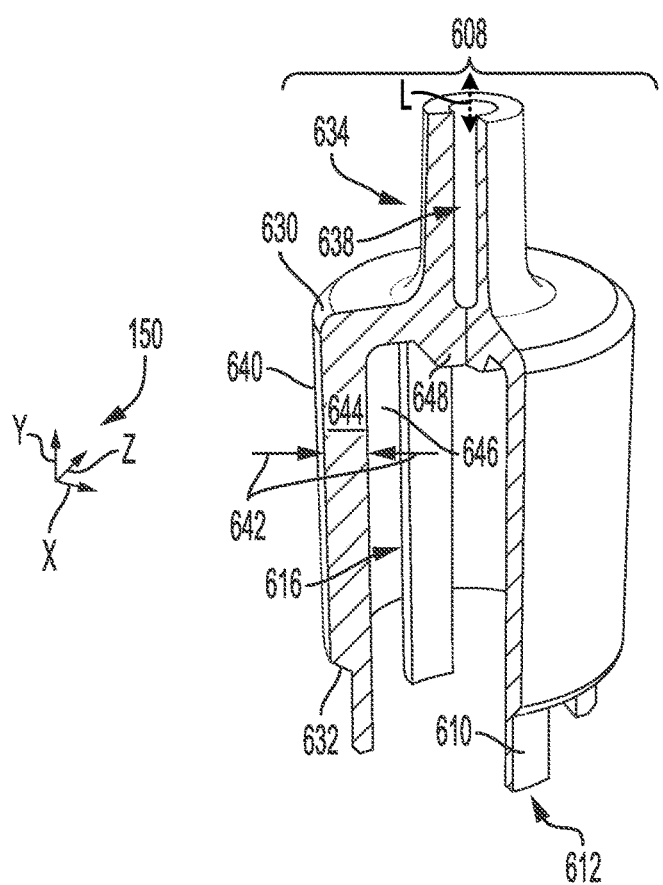

FIGS. 27-28 depict a detailed view of the plunger 608 in the valve 600, illustrated in FIGS. 25-26. Turning specifically to FIG. 27 illustrating the extension 634 with the opening 638 profiled to mate with the piston 636, shown in FIGS. 25-26, and tabs 610 at the distal end 612 of the plunger 608. The proximal seal 630 and the distal seal 632 are shown on an outer surface 640 (e.g., cylindrical outer surface) of the plunger 608.

FIG. 28 shows a cross-sectional view of the plunger 608 to reveal the contour of the features of the interior region of the plunger 608. The opening 638 in the extension 634 is again depicted along with the recess 616. The thickness 642 of a wall 644 of the plunger 608 may be substantially constant in regions axially aligned with the tabs 610 and decrease in the regions that are not axially aligned with the tabs, in the illustrated embodiment. The thickness 642 is measured along a radial axis from an interior surface 646 to the outer surface 640 of the plunger 608. However, in other embodiments, the wall may have a similar thickness in the different regions.

FIG. 28 also shows a protrusion 648 of the plunger 608 extending axially in the recess 616 towards the distal end 612 of the plunger 608. The protrusion 648 may function to increase the plunger's structural integrity and may also allow the spring to be easily placed in a desired alignment during valve assembly. Consequently, the valve may function more reliably and the efficiency of valve assembly may be increased.

FIGS. 1-28 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, an electrically actuated valve is provided that comprises a valve housing comprising: a valve chamber; and a first and second port in fluidic communication with the valve chamber; a valve sealing component comprising: a cap sealing section adjacent to an opening in the valve housing; and a valve seat arranged within the valve chamber between the first port and the second port; and a plunger configured to couple to a solenoid piston and including a proximal seal configured to selectively sealingly interface with the valve seat.

In another aspect, a method for operation of an electrically actuated valve is provided that comprises retracting a plunger to sealingly engage a proximal seal in the plunger with a valve seat in a valve sealing component; wherein the electrically actuated valve comprises: a valve housing comprising: a valve chamber; and three valve ports in fluidic communication with the valve chamber; and the valve sealing component comprising: a cap sealing section mated with a valve housing opening; and the valve seat mated with a section of the valve chamber axially between two of the three valve ports.

In yet another aspect, an electrically actuated valve for a vehicle cooling system is provided that comprises a valve housing comprising: a valve chamber; and three valve ports in fluidic communication with the valve chamber; a removable valve sealing component comprising: a cap sealing section mated with an opening in the valve housing; a valve seat mated with a section of the valve chamber positioned axially between two of the three valve ports; and a plurality of struts extending between the cap sealing section and the valve seat; and a plunger configured to mate with a solenoid piston and including a proximal seal configured to selectively sealingly interface with the valve seat.

In another aspect, an electrically actuated valve is provided that comprises a valve housing comprising: a valve chamber; and a first and second port in fluidic communication with the valve chamber; a solenoid assembly comprising: a body coupled to the valve housing; and a piston coupled to a plunger positioned in the valve chamber; and a valve sealing component comprising: a cap sealing section adjacent to the body; a valve seat arranged within the valve chamber between the first port and the second port; wherein the plunger includes a proximal seal configured to selectively sealingly interface with the valve seat.

In yet another aspect, a method for operation of an electrically actuated valve is provided that comprises retracting a plunger to sealingly interface with a proximal seal with a valve seat in a valve sealing component through de-energization of a solenoid in a solenoid assembly; wherein the electrically actuated valve comprises: a valve housing comprising: a valve chamber; and three valve ports in fluidic communication with the valve chamber; the solenoid assembly comprising a body coupled to the valve housing; and a piston coupled to the plunger, the plunger positioned in the valve chamber; and the valve sealing component comprising: a cap sealing section mated with a valve housing opening adjacent to the body of the solenoid assembly; and the valve seat mated with a section of the valve chamber axially between two of the three valve ports. In one example, the method may further comprise extending the plunger to sealingly disengage the proximal seal of the plunger from the valve seat in the valve sealing component.

In yet another example, an electrically actuated valve in a vehicle cooling system is provided that comprises a valve housing comprising: a valve chamber; and three valve ports in fluidic communication with the valve chamber; a solenoid assembly comprising: a body coupled to the valve housing; and a piston coupled to a plunger positioned in the valve chamber; and a removable valve sealing component comprising: a cap sealing section mated with an opening adjacent to the body; and a valve seat mated with a section of the valve chamber axially between two of the three valve ports; and a plurality of struts extending between the cap sealing section and the valve seat; wherein the plunger includes a proximal seal configured to selectively sealingly interface with the valve seat.

In any of the aspects or combinations of the aspects, the valve sealing component may include a plurality of struts extending between the valve seat and the cap sealing section in the valve sealing component.

In any of the aspects or combinations of the aspects, the proximal seal may include one or more openings extending axially therethrough.

In any of the aspects or combinations of the aspects, the electrically actuated valve may further comprise a snap ring coupled to the valve housing and configured to axially delimit an exterior flange of a body of a solenoid assembly.

In any of the aspects or combinations of the aspects, a threaded section of the valve housing may be configured to threadingly engage with a threaded section of a solenoid assembly.

In any of the aspects or combinations of the aspects, the electrically actuated valve may further comprise a retaining clip including two extensions each mated with a corresponding slit in the valve housing and configured to axially delimit an exterior flange of a body of a solenoid assembly.

In any of the aspects or combinations of the aspects, the electrically actuated valve may further comprise a spring including an end positioned in a recess in a distal seal of the plunger.

In any of the aspects or combinations of the aspects, the distal seal may be designed to selectively sealingly interface with a valve seat in the valve housing positioned axially between the second port and a third port.

In any of the aspects or combinations of the aspects, when the proximal seal in the plunger sealingly interfaces with the valve seat in the valve sealing component, one or more openings in the proximal seal may be blocked by the valve seat.

In any of the aspects or combinations of the aspects, the proximal seal may include a plurality of openings extending therethrough.

In any of the aspects or combinations of the aspects, while the proximal seal is sealed with the valve seat, fluid may flow through the plurality of openings is blocked by the valve seat and wherein while the proximal seal is spaced away from the valve seat, fluid flow through the plurality of openings is permitted.

In any of the aspects or combinations of the aspects, the electrically actuated valve may further comprise a snap ring coupled to the valve housing and axially delimiting an exterior flange of the body of the solenoid assembly or a retaining clip including two extensions mated each mated with a corresponding slit in the valve housing and axially delimiting the exterior flange of the body of the solenoid assembly.

In any of the aspects or combinations of the aspects, the plunger may include a distal seal designed to sealingly interface with a valve seat in the valve housing when the proximal seal is spaced away from the valve seat in the removable valve sealing component.

In any of the aspects or combinations of the aspects, the solenoid assembly may comprise a threaded section engaging with a threaded section in the valve housing.

In any of the aspects or combinations of the aspects, the electrically actuated valve may further comprise a spring including an end positioned in a recess in a distal seal of the plunger; wherein the spring is compressed while the piston in the solenoid assembly is in an extended position.

In any of the aspects or combinations of the aspects, the removable valve sealing component may include a sleeve portion mated with the solenoid piston.

In any of the aspects or combinations of the aspects, the electrically actuated valve assembly may further comprise a fourth port positioned between the valve seat in the valve housing and the second port and in fluidic communication with the third port.

In any of the aspects or combinations of the aspects, when the proximal seal in the plunger is sealingly engaged with the valve seat in the valve sealing component, one or more openings in the proximal seal may be blocked by the valve seat and the valve sealing component may include a plurality of struts extending between the valve seat and the cap sealing section.

In any of the aspects or combinations of the aspects, the electrically actuated valve may further comprise a spring including an end positioned in a recess in a distal seal of the plunger; wherein the spring may be compressed while the solenoid piston is in an extended position; and wherein the spring may be positioned between a third port and a fourth port.

In yet another aspect, there may be provided an electrically actuated valve. The valve may comprise a valve housing, a valve sealing component, a solenoid, a piston and a distal seal.

According to an aspect, the valve housing may comprise a hollow valve chamber having an open end, a first valve port in fluid flow communication with the hollow valve chamber, a second valve port in fluid flow communication with the hollow valve chamber, and a first valve seat located between the first and second valve ports, wherein the first and second valve ports may be axially spaced apart along a longitudinal axis.

According to an aspect, the valve sealing component may have an inner portion extending into the open end of the hollow valve chamber, and an outer portion comprising an external housing.

According to an aspect, the solenoid may comprise a solenoid coil provided in the external housing of the outer portion of the valve sealing component.

According to an aspect, the piston may have a first end located inside the solenoid and a second end projecting axially into the valve chamber from the outer portion of the valve sealing component.

According to an aspect, the distal seal may be axially movable by the piston and having a first sealing surface which is adapted to sealingly interface with the first valve seat.

According to an aspect, the electrically actuated valve may further comprise a return spring having a first end which is compressed between the distal seal and a second annular shoulder in the valve chamber, the return spring being adapted to bias the first sealing surface of the distal seal away from the first valve seat.

According to an aspect, the second annular shoulder may surround an opening in an end wall of the valve chamber through which the second valve port communicates with the valve chamber, wherein the end wall is located opposite to the open end of the valve housing.

According to an aspect, the valve chamber may comprise a cylindrical bore with one or more diameter reductions, including a first diameter reduction providing a first annular shoulder which defines the first valve seat.

According to an aspect, the first valve port may comprise an opening in a sidewall of the housing, and the second valve port communicates with the valve chamber through an opening in an end wall of the valve chamber which is located opposite to the open end of the valve housing.

According to an aspect, the inner portion of the valve sealing component may comprise a cap sealing section which closes the open end of the valve chamber and which is sealed to a sealing surface of the valve housing by a resilient sealing member.

According to an aspect, the inner portion of the valve sealing component may have external threads which engage internal threads provided inside the open end of the valve chamber and retain the valve sealing component in the open end of the valve chamber.

According to an aspect, the first valve element may comprise part of a plunger. The movable valve element may further comprise a first end portion which engages the second end of the piston and a second end portion which engages a return spring. The distal seal may comprise an annular disc which is located between the first and second end portions; and the distal seal comprises the first sealing surface.

According to an aspect, the electrically actuated valve may further comprise a third valve port, a second valve seat and a proximal seal.

According to an aspect, the third valve port may comprise an opening in the side wall of the housing, wherein the third valve port is located along the longitudinal axis between the first valve port and the open end of the valve chamber, and the first valve port is located along the longitudinal axis between the second and third valve ports.

According to an aspect, the second valve seat may be provided inside the valve chamber and located along the longitudinal axis between the first and second valve ports, and the third valve port.

According to an aspect, the proximal seal may be axially movable by the piston and have a second sealing surface which is adapted to sealingly engage the second valve seat.

According to an aspect, the distal and proximal seals may be axially spaced apart along the longitudinal axis.

According to an aspect, the distal and proximal seals may comprise part of a plunger, and each of the distal and proximal seals comprises an annular disc.

According to an aspect, the electrically actuated valve may further comprise one or more openings extending through the proximal seal in the axial direction.

According to an aspect, the one or more openings may extend through the annular sealing surface of the proximal seal.

According to an aspect, the inner portion of the valve sealing component may comprise an annular ring having a central opening and an outer surface adapted to seal with an inner surface of the valve chamber, between the third valve port and the first and second valve ports.

According to an aspect, the annular end portion may have a face which defines a second valve seat and which may be adapted to sealingly engage the second sealing surface.

According to an aspect, the inner portion of the valve sealing component may further comprise a cap sealing section having an outer surface which is adapted to seal the open end of the valve housing.

According to an aspect, the cap sealing section may further comprise a central, axially-extending sleeve portion which is open at both ends and is adapted to closely receive the piston with an axially sliding fit.

According to an aspect, the cap sealing section and the annular end portion may be axially spaced apart by a plurality of axially-extending struts, wherein spaces between the struts comprise fluid flow passages providing fluid flow communication with the first valve port.

According to an aspect, the electrically actuated valve may further comprise a fourth valve port which is in fluidic communication with the second valve port.

According to an aspect, the second valve port and the fourth valve port may each communicate with the valve chamber through an opening in an end wall of the valve chamber which is located opposite to the open end of the valve housing.

According to an aspect, the first and second sealing surfaces and the first and second valve seats may have a truncated cone shape.

In another representation, a fluid control valve in a vehicle system is provided that comprises a valve housing with an insertable seating body mated with a chamber in the valve housing and including a seat configured to sealingly engage an annular seal in a plunger extendable by an electromagnetic solenoid.

The technical effect of the valve control method described herein is to decrease the chance of valve leaks and increase manufacturing efficiency.

While various embodiments have been described in connection with the present disclosure, it will be understood that certain adaptations and modifications of the described exemplary embodiments can be made as construed within the scope of the present disclosure. Therefore, the above discussed embodiments are considered to be illustrative and not restrictive. As such, numerous valve variations are possible. For example, the above technology can be applied to valves that are includes in a variety of systems such as motor cooling systems, engine cooling systems, and the like. The subject matter of the present disclosure includes all novel and non-obvious combinations and sub-combinations of the various systems and configurations, and other features, functions, and/or properties disclosed herein.

As used herein, the terms "substantially" and "approximately" are construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An electrically actuated valve, comprising:
 a valve housing that is formed as a unitary, integral component comprising:
  a valve chamber comprising a cylindrical bore in the housing with one or more diameter reductions positioned axially therein and extending along a longitudinal axis from a valve chamber opening in the housing at one end of the valve chamber to an enclosed distal end of the valve chamber formed in the housing longitudinally opposite to the valve chamber opening; and
  a first port and a second port in fluidic communication with the valve chamber, the first and second ports each comprising an opening in a side wall of the housing;
 a valve sealing component comprising:
  a cap sealing section adjacent to the valve chamber opening in the valve housing; and
  a valve seat arranged within the valve chamber between the first port and the second port;
 a return spring having a first end and a second end; and
 a plunger configured to couple to a solenoid piston and including a proximal seal configured to selectively sealingly interface with the valve seat, a distal end of the plunger having a spring retaining groove thereon, the return spring positioned so that the first end is in contact with the distal end of the plunger and the second end is in contact with the housing proximate to the enclosed distal end of the valve chamber, the spring retaining groove configured to retain the return spring so as to permit inserting the plunger and the return spring retained on the plunger into the valve chamber opening in the valve housing.

2. The electrically actuated valve of claim 1, wherein the valve sealing component includes a plurality of struts extending between the valve seat and the cap sealing section in the valve sealing component.

3. The electrically actuated valve of claim 1, wherein the proximal seal includes one or more openings extending axially therethrough.

4. The electrically actuated valve of claim 1, further comprising a snap ring coupled to the valve housing and configured to axially delimit an exterior flange of a body of a solenoid assembly.

5. The electrically actuated valve of claim 1, wherein a threaded section of the valve housing is configured to threadingly engage with a threaded section of a solenoid assembly.

6. The electrically actuated valve of claim 1, further comprising a retaining clip including two extensions each mated with a corresponding slit in the valve housing and configured to axially delimit an exterior flange of a body of a solenoid assembly.

7. The electrically actuated valve of claim 1, wherein the return spring is compressed while the solenoid piston is in an extended position.

8. The electrically actuated valve of claim 7, wherein the distal seal is designed to selectively sealingly interface with a valve seat in the valve housing positioned axially between the second port and a third port.

9. The electrically actuated valve of claim 8, further comprising a fourth port positioned between the valve seat in the valve housing and the second port and in fluidic communication with the third port.

10. A method for operation of an electrically actuated valve, comprising:

retracting a plunger to sealingly engage a proximal seal in the plunger with a valve seat in a valve sealing component;

wherein the electrically actuated valve comprises:
- a valve housing that is formed as a unitary, integral component comprising:
  - a valve chamber comprising a cylindrical bore in the housing with one or more diameter reductions positioned axially therein and extending along a longitudinal axis from a valve chamber opening in the housing at one end of the valve chamber to an enclosed distal end of the valve chamber formed in the housing longitudinally opposite to the valve chamber opening; and
  - three valve ports in fluidic communication with the valve chamber the three valve ports each comprising an opening in a side wall of the housing; and
- the valve sealing component comprising:
  - a cap sealing section mated with the valve chamber opening in the valve housing; and
  - the valve seat mated with a section of the valve chamber axially between two of the three valve ports, wherein a distal end of the plunger has a return spring retaining groove thereon, wherein a return spring is positioned so that a first end of the return spring is in contact with the distal end of the plunger and a second end of the return spring is in contact with the housing proximate to the enclosed distal end of the valve chamber, and wherein the spring retaining groove is configured to retain the return spring so as to permit inserting the plunger and the return spring retained on the plunger into the valve chamber opening in the valve housing.

11. The method of claim 10, further comprising extending the plunger to sealingly disengage the proximal seal of the plunger from the valve seat in the valve sealing component.

12. The method of claim 10, wherein when the proximal seal in the plunger is sealingly engaged with the valve seat in the valve sealing component, one or more openings in the proximal seal are blocked by the valve seat and wherein the valve sealing component includes a plurality of struts extending between the valve seat and the cap sealing section.

13. An electrically actuated valve for a vehicle cooling system, comprising:
- a valve housing that is formed as a unitary, integral component comprising:
  - a valve chamber comprising a cylindrical bore in the housing with one or more diameter reductions positioned axially therein and extending along a longitudinal axis from a valve chamber opening in the housing at one end of the valve chamber to an enclosed distal end of the valve chamber formed in the housing longitudinally opposite to the valve chamber opening; and
  - three valve ports in fluidic communication with the valve chamber, the three valve ports each comprising an opening in a side wall of the housing;
- a removable valve sealing component comprising:
  - a cap sealing section mated with the valve chamber opening in the valve housing;
  - a valve seat mated with a section of the valve chamber positioned axially between two of the three valve ports;
  - a return spring having a first end and a second end; and
  - a plurality of struts extending between the cap sealing section and the valve seat; and
- a plunger configured to mate with a solenoid piston and including a proximal seal configured to selectively sealingly interface with the valve seat, a distal end of the plunger having a return spring retaining groove thereon, the return spring positioned so that the first end is in contact with the distal end of the plunger and the second end is in contact with the housing proximate to the enclosed distal end of the valve chamber, the return spring retaining groove configured to retain the return spring so as to permit inserting the plunger and the return spring retained on the plunger into the valve chamber opening in the valve housing.

14. The electrically actuated valve of claim 13, wherein the proximal seal includes a plurality of openings extending therethrough.

15. The electrically actuated valve of claim 14, wherein while the proximal seal is sealed with the valve seat, fluid flow through the plurality of openings is blocked by the valve seat and wherein while the proximal seal is spaced away from the valve seat, fluid flow through the plurality of openings is permitted.

16. The electrically actuated valve of claim 13, further comprising:
- a snap ring coupled to the valve housing and axially delimiting an exterior flange of a solenoid body; or
- a retaining clip including two extensions each mated with a corresponding slit in the valve housing and axially delimiting the exterior flange of the solenoid body.

17. The electrically actuated valve of claim 13, wherein the plunger includes a distal seal designed to sealingly interface with a valve seat in the valve housing when the proximal seal is spaced away from the valve seat in the removable valve sealing component.

18. The electrically actuated valve of claim 13, wherein the valve housing comprises a threaded section configured to threadingly engage with a threaded section of a solenoid assembly.

19. The electrically actuated valve of claim 13,
wherein the spring is compressed while the solenoid piston is in an extended position; and
wherein the spring is positioned between a third port and a fourth port.

20. The electrically actuated valve of claim 13, wherein the removable valve sealing component includes a sleeve portion mated with the solenoid piston.

* * * * *